United States Patent
Song et al.

(10) Patent No.: US 12,204,044 B2
(45) Date of Patent: Jan. 21, 2025

(54) METHOD FOR DETECTING TARGET OBJECT BY USING RADIO SIGNAL AND RELATED APPARATUS

(71) Applicant: Huawei Technologies Co., Ltd., Shenzhen (CN)

(72) Inventors: Sida Song, Beijing (CN); Sha Ma, Beijing (CN); Lutao Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 656 days.

(21) Appl. No.: 17/462,690

(22) Filed: Aug. 31, 2021

(65) Prior Publication Data

US 2021/0396839 A1    Dec. 23, 2021

Related U.S. Application Data

(63) Continuation of application No. PCT/CN2020/077337, filed on Feb. 29, 2020.

(30) Foreign Application Priority Data

Mar. 1, 2019 (CN) .......................... 201910159765.2

(51) Int. Cl.
  *G01S 7/02* (2006.01)
  *G01S 13/931* (2020.01)

(52) U.S. Cl.
  CPC .......... *G01S 7/0235* (2021.05); *G01S 13/931* (2013.01)

(58) Field of Classification Search
  CPC ....... G01S 7/0235; G01S 13/931; G01S 7/023
  See application file for complete search history.

(56) References Cited

U.S. PATENT DOCUMENTS

| | | | | |
|---|---|---|---|---|
| 4,862,070 A | * | 8/1989 | Ostertag | G01R 31/66 324/73.1 |
| 2007/0044559 A1 | * | 3/2007 | Andrews | G01N 33/383 73/584 |
| 2009/0033538 A1 | * | 2/2009 | Winkler | G01S 7/4008 342/21 |
| 2012/0293356 A1 | | 11/2012 | Barthel et al. | |
| 2015/0168546 A1 | * | 6/2015 | Nakagawa | G01S 13/931 342/21 |
| 2016/0124075 A1 | * | 5/2016 | Vogt | G01S 13/536 342/13 |
| 2018/0321363 A1 | | 11/2018 | Beer et al. | |
| 2018/0356495 A1 | | 12/2018 | Moss et al. | |

(Continued)

FOREIGN PATENT DOCUMENTS

| | | |
|---|---|---|
| CN | 1930490 A | 3/2007 |
| CN | 102707266 A | 10/2012 |

(Continued)

*Primary Examiner* — Bernarr E Gregory
*Assistant Examiner* — Hailey R Le
(74) *Attorney, Agent, or Firm* — Conley Rose, P.C.

(57) ABSTRACT

A method includes determining a first time domain range, where the first time domain range is one of L time domain ranges, and transmitting a first radio signal in the first time domain range, where any one of the L time domain ranges partially overlaps at least one of the other L−1 time domain ranges, and an absolute value of a difference between time domain start positions of any two of the L time domain ranges is not less than a first threshold F, and is less than a time domain length of the first time domain range.

20 Claims, 18 Drawing Sheets

(56) References Cited

U.S. PATENT DOCUMENTS

2019/0056477 A1    2/2019  Jonas et al.
2021/0250993 A1*   8/2021  Li ............................. H04B 1/69
2021/0266933 A1*   8/2021  Hong ...................... H04W 4/46

FOREIGN PATENT DOCUMENTS

| | | |
|---|---|---|
| CN | 102713667 A | 10/2012 |
| CN | 103983953 A | 8/2014 |
| CN | 104076328 A | 10/2014 |
| CN | 104655929 A | 5/2015 |
| CN | 106338727 A | 1/2017 |
| CN | 107907878 A | 4/2018 |
| CN | 108802753 A | 11/2018 |
| CN | 109031220 A | 12/2018 |
| DE | 102015221163 A1 | 5/2017 |
| EP | 1840595 A2 | 10/2007 |
| EP | 3098625 A1 | 11/2016 |
| JP | 2005009886 A | 1/2005 |
| WO | 8803276 A1 | 5/1988 |
| WO | 2006001821 A2 | 1/2006 |

* cited by examiner

METHOD FOR DETECTING TARGET OBJECT BY USING RADIO SIGNAL AND RELATED APPARATUS

CROSS-REFERENCE TO RELATED APPLICATIONS

This is a continuation of International Patent Application No. PCT/CN2020/077337 filed on Feb. 29, 2020, which claims priority to Chinese Patent Application No. 201910159765.2 filed on Mar. 1, 2019. The disclosures of the aforementioned applications are hereby incorporated by reference in their entireties.

TECHNICAL FIELD

The present disclosure relates to wireless communications technologies in the field of an automated driving system (ADS), intelligent driving, an intelligent connected vehicle, an intelligent vehicle, and an electric vehicle, and in particular, to a method for detecting a target object by using a radio signal and a related apparatus.

BACKGROUND

With the development of society, more and more machines in modern life are developing towards automation and intelligence. A vehicle used for mobile travel is no exception. An intelligent vehicle is gradually entering people's daily life. In recent years, an advanced driver-assistance system (ADAS) plays an important role in the intelligent vehicle. The system uses various sensors installed on the vehicle to sense or perceive a surrounding environment, collect data, identify, detect, and track static and moving objects, and perform systematic calculation and analysis in combination with map data of a navigator during driving of the vehicle, and therefore a driver can be aware of possible dangers in advance. This effectively improves driving comfort and safety of the vehicle.

In an architecture of unmanned driving (or assisted driving or intelligent driving), a sensor layer includes a vehicle-mounted detection apparatus, for example, a vision sensor such as a vehicle-mounted camera, and a radar sensor such as a vehicle-mounted millimeter wave radar, a vehicle-mounted laser radar, and a vehicle-mounted ultrasonic radar. Millimeter wave radar first becomes a main sensor of an unmanned driving system because of its low cost and mature technology. The ADAS has been developed to have more than 10 functions, including adaptive cruise control (ACC), autonomous emergency braking (AEB), lane change assist (LCA), blind spot monitoring (BSD). All these functions rely on the vehicle-mounted detection apparatus, for example, the millimeter wave radar. A millimeter wave is an electromagnetic wave whose wavelength is in a specific range, for example, 1 to 10 millimeters (mm), and a corresponding frequency range is 30 to 300 gigahertz (GHz). In this frequency band, a feature related to the millimeter wave is very suitable for the vehicle-mounted or automatic driving field. For example, a large bandwidth, rich frequency domain resources, and a low antenna side lobe are conducive to implementing imaging or quasi-imaging, a short wavelength is conducive to reducing a size of a radar device and a diameter of an antenna, so that the radar device becomes lighter, a narrow beam indicates that, in a same antenna size, a beam of the millimeter wave is much narrower than that of a microwave, so that a radar resolution is high, and a strong penetration capability indicates that, compared with a laser radar and an optical system, the millimeter wave has a stronger capability of penetrating smoke, dust, and fog, and can work around the clock.

With wide use of the vehicle-mounted detection apparatus, mutual interference between vehicles in which the vehicle-mounted detection apparatuses are located becomes more and more serious. The mutual interference reduces a detection probability of the vehicle-mounted detection apparatus or improves a false alarm (ghost) probability of the vehicle-mounted detection apparatus, which severely affects driving safety or comfort of the vehicle. Under this premise, how to reduce interference between vehicle-mounted detection apparatuses is a technical problem that urgently needs to be resolved.

SUMMARY

Embodiments of the present disclosure disclose a method for detecting a target object by using a radio signal and a related apparatus, which can reduce interference between detection apparatuses.

According to a first aspect, an embodiment of this application provides a method for detecting a target object by using a radio signal. The method is applied to a first detection apparatus, and the method includes determining a first time domain range, where the first time domain range is one of L time domain ranges, and transmitting a first radio signal in the first time domain range, where any one of the L time domain ranges partially overlaps at least one of the other L−1 time domain ranges, and an absolute value of a difference between time domain start positions of any two of the L time domain ranges is not less than a first threshold F, and is less than a time domain length of a time domain range with a shortest time domain length in the L time domain ranges, where L is a positive integer greater than 1.

Further, any two of the L time domain ranges partially or not completely overlap in time domain. Completely overlapping herein means that the two time domain ranges are completely the same, or that one of the two time domain ranges is completely included in the other time domain range.

The L time domain ranges may be preset or defined. For example, the L time domain ranges are set or defined by setting or defining time domain intervals and time domain lengths of the L time domain ranges. The time domain length may be indicated by using an interval of at least one type of minimum time points, maximum time points, and central time points of at least two of the L time domain ranges. This is not limited, and is subject to a fact that the time domain length can be clearly determined.

By performing the foregoing method, each detection apparatus transmits a radio signal in a determined time domain range in which mutual interference can be avoided, so as to avoid interference caused by a transmit signal or a related signal of any detection apparatus in determining a target object by another detection apparatus. Partially overlapping between time domains can avoid a waste of time domain resources caused by completely separating frequency sweep periods of a plurality of detection apparatuses in time domain, so that time domain resources can be effectively used, relatively high anti-interference performance can be implemented at a relatively low time domain resource cost, and communication of a larger quantity of detection apparatuses can be supported.

The method provided in this application improves an automatic capability or an ADAS capability of a vehicle, and may be applied to the internet of vehicles, for example, a vehicle-to-everything (V2X) technology, a Long-Term Evolution-Vehicle (LTE-V) technology, a vehicle-to-vehicle (V2V) technology, and the like.

In a possible implementation, the first threshold F is greater than or equal to a frequency sweep period of the first radio signal, and the first threshold F is an integer multiple of the frequency sweep period of the first radio signal. Alternatively, an absolute value of a difference between a time domain start position of any one of the L time domain ranges except the first time domain range and a time domain start position of the first time domain range is a positive integer multiple of the first threshold F, where the first threshold F is greater than or equal to the frequency sweep period of the first radio signal, and the first threshold F is an integer multiple of the frequency sweep period of the first radio signal. It may be understood that, the first threshold F is limited to be an integer multiple of the frequency sweep period of the first radio signal, so that it can be ensured that a time domain range in which interference is measured is greater than or equal to one frequency sweep period. This ensures a resolution of measuring an interference signal, and improves an interference cancellation effect. In addition, the absolute value of the difference is limited to be a positive integer multiple of the first threshold F, and subsequently, an interference signal may be cancelled more accurately by using the multiple relationship during interference cancellation.

In a possible implementation, time domain lengths of the L time domain ranges are the same, and the time domain length is an integer multiple of the frequency sweep period of the first radio signal. It may be understood that the time domain lengths of the L time domain ranges are limited to be the same. Subsequently, interference cancellation can be implemented by performing relatively simple processing by the first detection apparatus based on this feature, and no more complex mathematical transformation is required.

In a possible implementation, there are at least two time domain ranges with different time domain lengths in the L time domain ranges. Optionally, the L time domain ranges include time domain ranges with T types of time domain lengths. A time domain range of each type of time domain length is corresponding to a detection apparatus of a corresponding type. Alternatively, there are a plurality of possible types of detection apparatuses, and each type of detection apparatus is corresponding to a time domain range of a corresponding time domain length. Further, a detection apparatus of a corresponding type can transmit a radio signal only in a time domain range of a corresponding time domain length. Optionally, each of the T types of time domain lengths is an integer multiple of the frequency sweep period of the first radio signal.

In a possible implementation, the method further includes receiving a second radio signal at a time domain position other than the first time domain range in the L time domain ranges, where the second radio signal comes from at least one second detection apparatus. It may be understood that the second radio signal may be used to determine an interference signal of the at least one second detection apparatus in the first time domain range, and the interference signal is used to subsequently cancel interference of an echo wave signal received by the first detection apparatus in a first time domain resource.

In a possible implementation, the L time domain ranges include at least one second time domain range, and the at least one second time domain range is corresponding to the at least one second detection apparatus. In other words, the first time domain range and the second time domain range each belong to a time domain range in the L time domain ranges, and in each second time domain range, a second detection apparatus transmits a radio signal by using the second time domain range for radar detection. For example, the first detection apparatus is configured to transmit the first radio signal in the first time domain range for radar detection, a second detection apparatus 1 is configured to transmit a first radio signal in a second time domain range 1 for radar detection, and a second detection apparatus 2 is configured to transmit a first radio signal in the second time domain range 2 for radar detection. The second detection apparatus herein is different from the first detection apparatus, but types of the first detection apparatus and the second detection apparatus may be the same or different. In a case in which types of the first detection apparatus and the second detection apparatus are the same, time domain lengths of time domain ranges respectively corresponding to the first detection apparatus and the second detection apparatus are the same.

In a possible implementation, the method further includes receiving a third radio signal in the first time domain range, where the third radio signal includes a reflected signal of the first radio signal. It may be understood that the third radio signal includes the reflected signal of the first radio signal, and further includes a signal transmitted and/or reflected after being transmitted by the at least one second detection apparatus. In conclusion, the first detection apparatus may strip the reflected signal of the first radio signal from the third radio signal, to subsequently determine an intermediate frequency signal.

In a possible implementation, the method further includes determining information about the target object based on the third radio signal and the second radio signal. Further, the second radio signal includes a radio signal reflected and/or reflected after being transmitted by the at least one second detection apparatus. Therefore, it may be determined, based on the second radio signal, the included radio signal reflected and/or reflected after being transmitted by the at least one second detection apparatus. In addition, because an interference signal on the third radio signal also comes from the at least one second detection apparatus, the interference signal on the third radio signal may be cancelled based on the determined radio signal reflected and/or reflected after being transmitted by the at least one second detection apparatus. Then, the intermediate frequency signal may be obtained based on a signal after interference cancellation, to obtain the information about the target object based on the intermediate frequency signal, for example, information such as a distance from the target object, an angle from the target object, and a radial relative velocity from the target object.

In a possible implementation, determining information about the target object based on the third radio signal and the second radio signal includes determining a phase difference $\Delta\Phi_i$ between two adjacent frequency sweep periods of the second radio signal based on the second radio signal and the first radio signal, performing interference $\Delta\Phi_i$ cancellation on the third radio signal based on the phase difference between the two adjacent frequency sweep periods of the second radio signal and the second radio signal, to obtain an intermediate frequency signal, and determining the information about the target object based on the intermediate frequency signal.

According to a second aspect, a detection apparatus is provided. The detection apparatus has a function of implementing the method in any possible implementation of the first aspect. The function may be implemented by hardware, or by hardware executing corresponding software. The hardware or the software includes one or more modules corresponding to the function.

According to a third aspect, a detector is provided. The detector includes a processor and a transmit antenna. The processor is configured to determine a first time domain range, where the first time domain range is one of L time domain ranges, and the transmit antenna is configured to transmit a first radio signal in the first time domain range, where any one of the L time domain ranges partially overlaps at least one of the other L−1 time domain ranges, and an absolute value of a difference between time domain start positions of any two of the L time domain ranges is not less than a first threshold F, and is less than a time domain length of a time domain range with a shortest time domain length in the L time domain ranges, where L is a positive integer greater than 1.

Further, any two of the L time domain ranges partially or not completely overlap in time domain. Completely overlapping herein means that the two time domain ranges are completely the same, or that one of the two time domain ranges is completely included in the other time domain range.

In the technical solution provided in the third aspect, each detection apparatus transmits a radio signal in a determined time domain range in which mutual interference can be avoided, to avoid interference caused by a transmit signal or a related signal of any detection apparatus in determining a target object by another detection apparatus. Partially overlapping between time domains can avoid a waste of time domain resources caused by completely separating frequency sweep periods of a plurality of detection apparatuses in time domain, so that time domain resources can be effectively used, relatively high anti-interference performance can be implemented at a relatively low time domain resource cost, and communication of a larger quantity of radars can be supported.

In a possible implementation, the detector further includes a receive antenna, configured to receive a second radio signal at a time domain position other than the first time domain range in the L time domain ranges. The second radio signal comes from at least one second detection apparatus, and configured to receive a third radio signal, where the third radio signal includes a reflected signal of the first radio signal. Correspondingly, the processor is configured to determine information about the target object based on the third radio signal and the second radio signal.

An embodiment of this application further provides a detection apparatus. The detection apparatus includes at least one processor, at least one memory, and a communications interface. The communications interface, the at least one memory, and the at least one processor are coupled. A terminal communicates with another device by using the communications interface. The at least one memory is configured to store a computer program, so that when the computer program is executed by the at least one processor, the method for detecting a target object by using a radio signal in the first aspect and the possible implementations of the first aspect is implemented.

An embodiment of this application further provides a computer-readable storage medium, for example, a computer non-transient readable storage medium. The computer-readable storage medium stores a computer program, and when the computer program is run on a computer, the computer is enabled to perform any one of the possible methods provided in the first aspect. For example, the computer may be at least one storage node.

This embodiment of this application further provides a computer program product. When the computer program product runs on a computer, any method provided in the first aspect is performed. For example, the computer may be at least one storage node.

An embodiment of this application further provides a chip. The chip is configured to support a detection apparatus in implementing a function in any possible method in the first aspect, for example, generating or processing data and/or information in the foregoing method. In a possible design, the chip further includes a memory. The memory is configured to save necessary program instructions and data of the detection apparatus.

An embodiment of this application further provides a chip. The chip includes a processing module and a communications interface. The processing module is configured to control the communications interface to communicate with the outside, and the processing module is further configured to implement any possible method in the first aspect.

It may be understood that any terminal, computer storage medium, computer program product, chip, or the like provided above is configured to perform a corresponding method provided in the foregoing description. Therefore, for a beneficial effect that can be achieved by any terminal, computer storage medium, computer program product, chip, or the like, refer to a beneficial effect in the corresponding method. Details are not described herein again.

BRIEF DESCRIPTION OF DRAWINGS

Accompanying drawings used in embodiments of the present disclosure are described below.

DESCRIPTION OF EMBODIMENTS

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that With evolution of the network architecture and emergence of a new service scenario, the technical solutions provided in the embodiments of this application are also applicable to similar technical problems.

Figure 1:
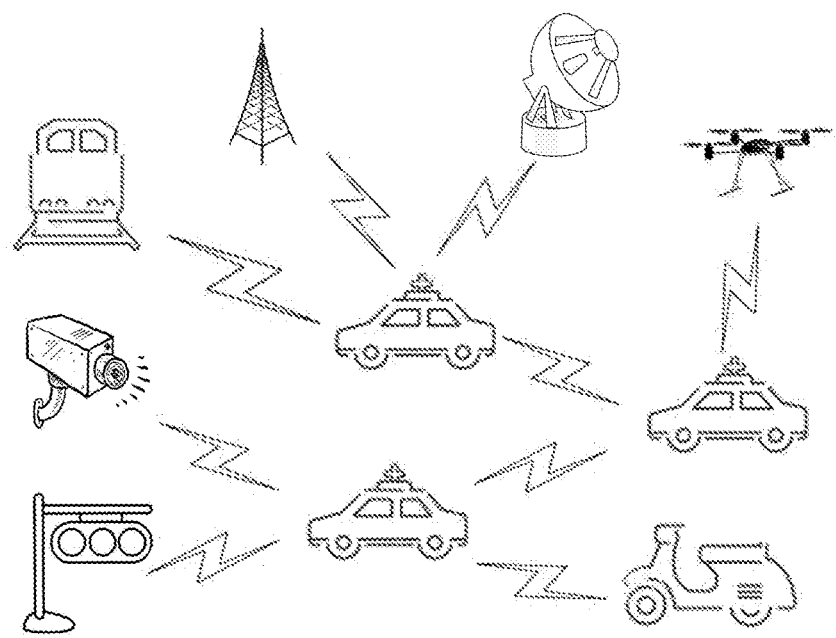
FIG. 1 is a schematic diagram of a possible application scenario according to an embodiment of this application.

FIG. 1 is a schematic diagram of a possible application scenario according to an embodiment of this application. The foregoing application scenario may be unmanned driving, automatic driving, intelligent driving, connected driving, or the like. A detection apparatus may be installed on a motor vehicle (for example, an unmanned vehicle, an intelligent vehicle, an electric car, or a digital vehicle), a drone, a rail car, a bicycle, a signal light, a velocity measurement apparatus or a network device (for example, a base station or a terminal device in various systems), or the like. This application is applicable to detection apparatuses between vehicles, detection apparatuses between a vehicle and another apparatus such as a drone, or detection apparatuses between other apparatuses. An installation position and a function of the detection apparatus are not limited in this application.

The following explains terms that may appear in the embodiments of this application.

Radar: A radar is also referred to as a radar apparatus, or referred to as a detector, a detection apparatus, or a radio signal sending apparatus. A working principle of the radar is to detect a corresponding target object by using a transmit signal (or referred to as a detection signal) and receiving a reflected signal reflected by the target object.

Transmit cycle or frequency sweep cycle: A transmit cycle or frequency sweep cycle is a transmit cycle in which a detection apparatus transmits a radio signal with a complete waveform. The detection apparatus generally sends radio signals in a plurality of frequency sweep periods in continuous duration. For the continuous duration herein, refer to a radio detection subframe (or a time domain range) in the following. For ease of description, the "radio detection subframe" and the "time domain range" in the following may appear alternately, but have a same meaning, and both indicate duration in which the detection apparatus continuously transmits a radio signal at a time.

Initial frequency: At the beginning of a transmit cycle, a radar transmits a radar signal on an initial frequency, and a transmit frequency changes in the transmit cycle on a basis of the initial frequency.

Frequency sweep bandwidth: A frequency sweep bandwidth is a bandwidth occupied by a radar signal waveform. Here, it should be noted that the "frequency sweep bandwidth" is defined for ease of description, and is technically the bandwidth occupied by the radar signal waveform. Further, a frequency band occupied by the radar signal waveform may be referred to as a frequency sweep frequency band. A transmit cycle of a radar signal is also referred to as a frequency sweep period of time, namely, a period of time for transmitting a complete waveform.

Frequency-modulated continuous wave: A frequency-modulated continuous wave is an electromagnetic wave whose frequency varies with time.

Linear frequency-modulated continuous wave: A linear frequency-modulated continuous wave is an electromagnetic wave whose frequency changes linearly with time. The linear change herein is generally referred to a linear change in one transmit cycle. Further, a waveform of the linear frequency-modulated continuous wave is generally a sawtooth wave, a triangular wave, or another possible waveform, for example, a pulse.

Maximum ranging distance: A maximum ranging distance is also referred to as a maximum detection distance, and is a parameter related to a radar configuration (a factory setting parameter or a parameter related to the factory setting parameter). For example, a maximum ranging distance of a long-distance ACC radar is 250 meters (m), and a maximum ranging distance of a medium-distance radar is 70 to 100 m. If the maximum ranging distance is 250 m, a specific application scenario does not have a high requirement on a distance resolution of the radar. Optionally, the distance resolution is related to the frequency sweep bandwidth.

Intermediate frequency (IF) signal: An intermediate frequency signal is a signal after a radar local-frequency signal and a received target reflected signal are processed by a frequency mixer, namely, the intermediate frequency signal. Further, a part of a frequency-modulated continuous wave signal generated by an oscillator is used as the local-frequency signal, and the other part of the frequency-modulated continuous wave signal is used as a transmit signal and the transmit signal is transmitted by using a transmit antenna. Frequency mixing is performed on a reflected signal of the transmit signal received by the receive antenna and the local-frequency signal, to obtain the "intermediate frequency signal". At least one of position information, velocity information, or angle information of the target object may be obtained by using the intermediate frequency signal. The position information, the velocity information, and the angle information may respectively be relative position information, relative velocity information, and relative angle information relative to a current radar. Further, a frequency of the intermediate frequency signal is an intermediate frequency.

Figure 2:
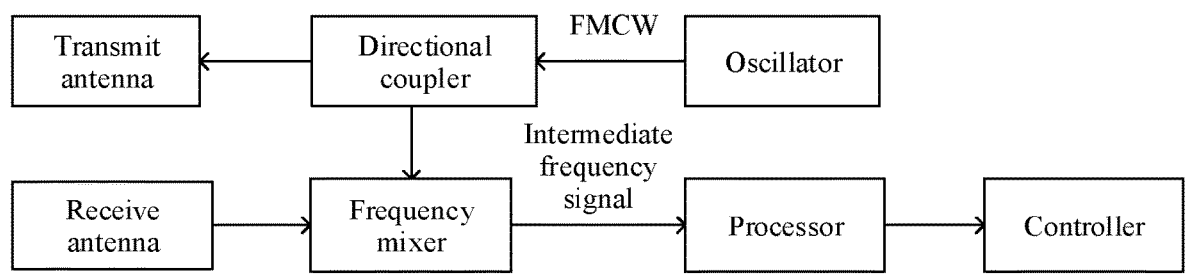
FIG. 2 is a schematic structural diagram of a vehicle-mounted millimeter wave radar apparatus according to an embodiment of this application.

With reference to FIG. 2, the following describes a radar signal processing and transmission process by using a reference architecture of a vehicle-mounted millimeter-wave radar apparatus. FIG. 2 is a schematic diagram of an example structure of a vehicle-mounted millimeter-wave radar apparatus. The vehicle-mounted millimeter-wave radar apparatus generally includes apparatuses such as an oscillator, a transmit antenna, a receive antenna, a frequency mixer, and a processor. The controller in FIG. 2 is generally not included in the vehicle-mounted millimeter-wave radar apparatus, but is included at a receive end of a signal output by the vehicle-mounted millimeter-wave radar apparatus. For example, the controller may be located in a vehicle, or may be a processing apparatus configured to control driving of the vehicle. This is not limited in this embodiment of this application. The oscillator generates a frequency-modulated continuous-wave (FMCW), for example, a signal whose frequency increases linearly with time. The signal may be referred to as a linear FMCW (LFMCW). A part of the foregoing frequency-modulated continuous wave is output, by using a directional coupler, to the frequency mixer as a local-frequency signal, and the other part is transmitted by using the transmit antenna. The receive antenna receives a signal reflected by an object in front of a vehicle, and the frequency mixer performs frequency mixing on this signal and the local-frequency signal to obtain an intermediate frequency signal. The intermediate frequency signal includes information about a target object, the information about the target object may be a relative parameter between the target object and a vehicle in which a vehicle-mounted radar is located, for example, at least one information of a relative distance, a relative velocity, or a relative angle between the target object and the vehicle. The intermediate frequency signal (for example, may be an intermediate frequency signal that is processed by a low-pass filter and that is after amplification processing, and the low-pass filter is not shown in FIG. 2) is transmitted to the processor. The processor processes the intermediate frequency signal (for example, may perform fast Fourier transformation or spectrum analysis on the signal) to obtain the information about the target object, and finally outputs the information to the controller to control the vehicle. Generally, based on a configuration of the radar, an intermediate frequency corresponding to a maximum ranging distance is considered as a maximum intermediate frequency. A signal whose frequency is greater than the intermediate frequency is filtered out by the low-pass filter.

The following uses a sawtooth wave as an example to describe ranging and velocity measurement principles of a millimeter-wave radar. To facilitate analysis, an analytic signal is used for analysis (ranging and velocity measurement principles of a triangular wave are similar to those of the sawtooth wave).

Figure 3:
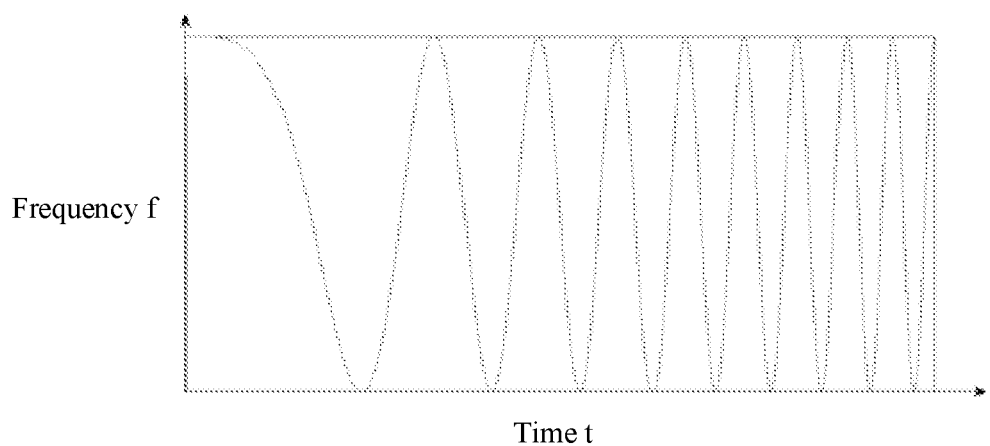
FIG. 3 is a schematic diagram of a frequency change of a transmit signal, a reflected signal, and an intermediate frequency signal according to an embodiment of this application.
Figure 4:
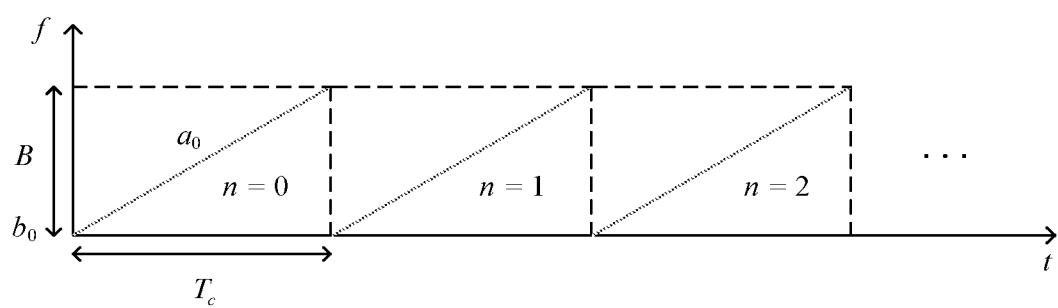
FIG. 4 is a schematic diagram of a frequency-modulated continuous wave multi-period time frequency according to an embodiment of this application.

As shown in FIG. 3, the frequency-modulated continuous wave is a signal whose frequency changes linearly with time. As shown in FIG. 4, a period of the frequency-modulated continuous wave is $T_c$, a slope is $a_0$, a bandwidth is B, and an initial frequency of the frequency-modulated continuous wave is $b_0$.

Therefore, an equivalent baseband signal $s_{BB,n}^{Tx}(t)$ of a frequency-modulated continuous wave that is in an $n^{th}$ period and that is output by the oscillator may be represented by a formula (1.1):

$$s_{BB,n}^{Tx}(t) = A^* \exp\left\{j2\pi\left[\frac{a_0}{2}(t-nT_c)^2 + b_0(t-nT_c) + \varphi_0\right]\right\} \quad (1.1)$$

$$nT_c \le t < (n+1)T_c, n = 0, 1, 2, \ldots, N-1$$

A is an amplitude of the equivalent baseband signal, $a_0$ is a slope of a linear frequency-modulated signal sent by an oscillator of a detection radar, $b_0$ is an intercept, $\varphi_0$ is an initial phase, and N is a total quantity of periods in which the frequency-modulated continuous wave is continuously sent. The frequency is defined as a change rate of a phase relative to time. Therefore, a frequency f of the equivalent baseband signal may be represented by a formula (1.2):

$$f = \frac{d\left(\frac{a_0}{2}(t-nT_c)^2 + b_0(t-nT_c) + \varphi_0\right)}{dt} = a_0 t + (b_0 - a_0 nT_c), \quad (1.2)$$

$$nT_c \le t < (n+1)T_c, n = 0, 1, 2, \ldots, N-1$$

FIG. 4 is a schematic diagram of a function corresponding to the formula (1.2).

After up-conversion, the equivalent baseband signal $s_{BB,n}^{Tx}(t)$ of the frequency-modulated continuous wave in the $n^{th}$ period in N periods is radiated by the transmit antenna, and a radiated signal $S_{RF,n}^{Tx}(t)$ may be represented by a formula (1.3):

$$S_{RF,n}^{Tx}(t) = s_{BB,n}^{Tx}(t)\exp(j2\pi f_c(t-nT_c)) = \quad (1.3)$$

$$A\exp\left\{j2\pi\left[\frac{a_0}{2}(t-nT_c)^2 + (b_0+f_c)(t-nT_c) + \varphi_0\right]\right\},$$

$$nT_c \le t < (n+1)T_c, \quad n = 0, 1, 2, \ldots, N-1$$

$f_c$ is a carrier frequency, and the radiated signal $S_{RF,n}^{Tx}(t)$ is reflected back once encountering an obstacle (also referred to as a target object). A shape of a transmit wave is the same as that of a reflected wave, and there is only a delay. A receive signal $S_{RF,n}^{Rx}(t)$ of the frequency-modulated continuous wave in the $n^{th}$ period may be represented by a formula (1.4):

$$S_{RF,n}^{Rx}(t) = A'\exp(-j2\pi f_d t) \times \exp \quad (1.4)$$

$$\left\{j2\pi\left[\frac{a_0}{2}(t-nT_c-\tau)^2 + b_0(t-nT_c-\tau) + \varphi_0\right]\right\} \times$$

$$\exp[j2\pi(f_c(t-nT_c-\tau))] \quad \tau + nT_c \le$$

$$t < \tau + (n+1)T_c, \quad n = 0, 1, 2, \ldots, N-1$$

In the formula (1.4), A' is a signal amplitude after a transmit antenna gain, target reflection, propagation loss, and a receive antenna gain are performed on the signal $S_{RF,n}^{Tx}(t)$. $f_d$ is a Doppler frequency formed by a radial relative velocity between the target object and the detection radar. τ is a total delay from a time point at which a radar signal (also referred to as a radio signal) is transmitted by a transmitter of the detection radar and is reflected by the target object to a time point at which a signal echo wave is received by a receiver of the detection radar. A relationship between τ and a target distance d (namely, a radial relative distance between the target object and the detection radar) may be represented by a formula (1.5):

$$\tau = \frac{2d}{c} \tag{1.5}$$

In the formula (1.5), c is a velocity of light.

The frequency mixer of the detection radar performs frequency mixing on the receive signal and the transmit signal, and an intermediate frequency (IF) signal after processing of an intermediate frequency filter is output. The intermediate frequency signal $S_{IF,n}^{Rx}(t)$ is shown in a formula (1.6):

$$S_{IF,n}^{Rx}(t) = \frac{1}{A} S_{RF,n}^{Tx}(t) \times \left[ S_{RF,n}^{Rx}(t) \right]^* = \tag{1.6}$$

$$A' \times \exp(j\Phi_n) \times \exp\{j2\pi[(a_0\tau + f_d)(t - nT_c)]\},$$

$$nT_c + \tau_0 \le t < (n+1)T_c \xrightarrow{u = t - nT_c} S_{IF,n}^{Rx}(u) =$$

$$A' \times \exp(j\Phi_n) \times \exp\{j2\pi[(a_0\tau + f_d)u]\}, \tau_0 \le u < T_c$$

In the formula $$(1.6), \quad \Phi_n = 2\pi \left[ f_c\tau - \left( \frac{a_0}{2}\tau^2 - b_0\tau \right) + f_d nT_c \right],$$

the intermediate frequency signal $S_{IF,n}^{Rx}(t)$ is sent to the processor for Fourier transformation, to obtain an intermediate frequency (a frequency of the intermediate frequency signal) $f_{IF}$, and the intermediate frequency $f_{IF}$ is represented by a formula (1.7):

$$f_{IF} = a_0\tau + f_d \tag{1.7}$$

In the formula (1.7), because $f_d \ll a_0\tau$, $f_{IF} \approx a_0\tau$.

Figure 5:
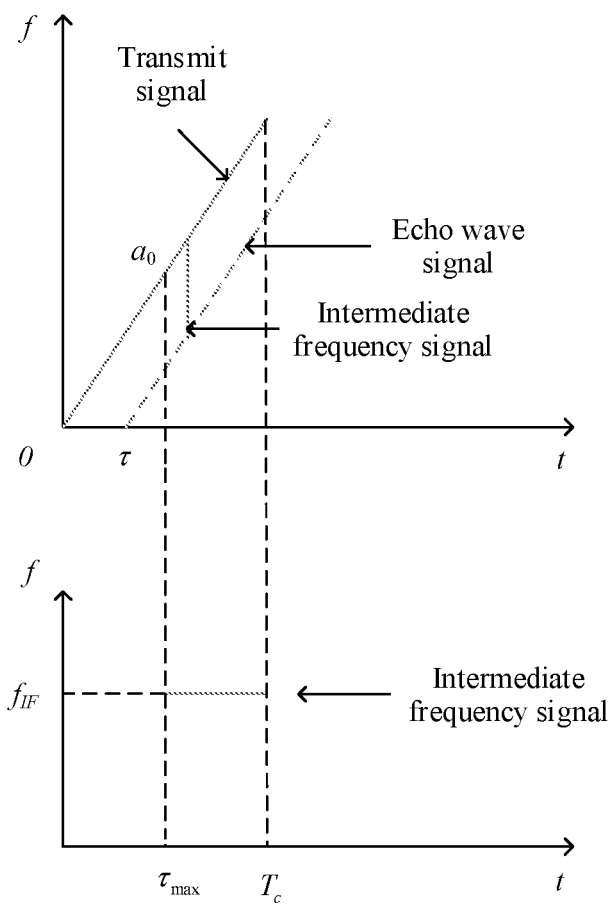
FIG. 5 is a schematic diagram of a relationship among a transmit signal, a receive signal, and an intermediate frequency signal according to an embodiment of this application.

In addition, in FIG. 5, a time range in which the radar signal is detected is $\tau_{max} \sim T_c$, and $\tau_{max}$ is an echo wave delay corresponding to a maximum detection distance. It can be learned that the intermediate frequency $f_{IF}$ is a product of a slope of a transmit wave and the delay τ. For details, refer to a formula (1.8):

$$f_{IF} \approx a_0 \cdot \tau = \frac{B}{T_c} \cdot \frac{2d}{c} = \frac{2d}{c \cdot T_c} * B \tag{1.8}$$

Based on the formula (1.8), it can be learned that the target distance d between the detection radar and the target object can be shown in a formula (1.9):

$$d = \frac{c \cdot T_c}{2B} * f_{IF} \tag{1.9}$$

For velocity detection, it can be learned from the formula (1.6) that a phase difference ΔΦ of echo wave intermediate frequency signals in two adjacent periods at a same time sampling point is a fixed value and may be represented by a formula (1.10):

$$\Delta\Phi = \Phi_{n+1} - \Phi_n = 2\pi * f_d * T_c \tag{1.10}$$

A Doppler frequency $f_d$ may be obtained by performing Fourier transform on a phase sequence of echo wave intermediate frequency signals at a same time sampling point in a plurality of consecutive periods. A relationship of a radial relative velocity v between the detection radar and the target object may be represented by a formula (1.11):

$$f_d = \frac{2v}{\lambda} \tag{1.11}$$

In the formula (1.11), λ is a carrier wavelength of the radar signal. Therefore, the radial relative velocity v between the detection radar and the target object is shown in a formula (1.12):

$$v = \frac{\lambda * f_d}{2} \tag{1.12}$$

The foregoing derivation is performed based on one target object, and the foregoing principle is also applicable to a plurality of target objects. In other words, a plurality of intermediate frequency signals is obtained after frequency mixing, and intermediate frequencies respectively corresponding to the plurality of target objects may be obtained after the plurality of intermediate frequency signals are sent to the processor for Fourier transformation. According to the foregoing derivation, a frequency difference (the frequency of the intermediate frequency signal) between the transmit signal and the receive signal of the detection radar and the delay are in a linear relationship. The farther an object is, the later a returned wave is received, so that a frequency difference between the returned wave and an incident wave is larger. A distance between the detection radar and the target object can be determined by judging a value of the frequency of the intermediate frequency signal. It should be noted that a slope of the transmit signal reflects a degree to which a transmit frequency or a receive frequency changes with time. If the frequency of the transmit signal decreases with time, the slope is a negative value, and if the frequency of the transmit signal increases with time, the slope is a positive value. For the triangular wave, a slope of a rising edge and a slope of a falling edge are opposite numbers. An absolute value of the slope may also be referred to as a change range of the frequency in a unit time. Meanings of the two representation manners in this embodiment of this application are the same.

Figure 6:
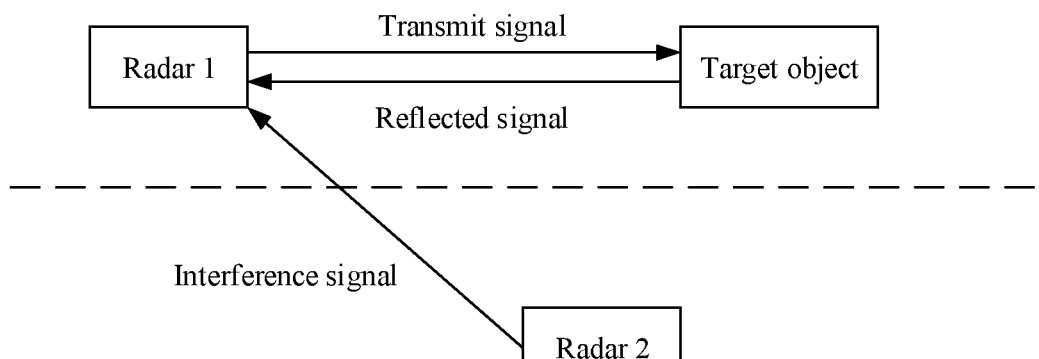
FIG. 6 is a schematic diagram of mutual interference of vehicle-mounted radars according to an embodiment of this application.

FIG. 6 is a schematic diagram of mutual interference between vehicle-mounted radars. As shown in FIG. 6, a radar 1 (which may be considered as the foregoing detection radar) sends a transmit signal, and receives a reflected signal reflected back by the transmit signal on a target object. When the radar 1 receives a target reflected signal, a receive antenna of the radar 1 receives a transmit signal or a reflected signal (which can be considered as an interference radar) of a radar 2, namely, an interference signal. If the radar 1 detects the interference signal from the radar 2 in a time range in which the radar 1 transmits the signal and receives the reflected signal, the radar 1 may mistakenly consider that an object corresponding to the interference signal in the front is the "target object", but actually the "target object" does not exist, which is called as a "ghost" or "false alarm". After the false alarm is generated, an automatic driving vehicle performs incorrect driving control due to misjudgment of the target object.

Figure 7A:
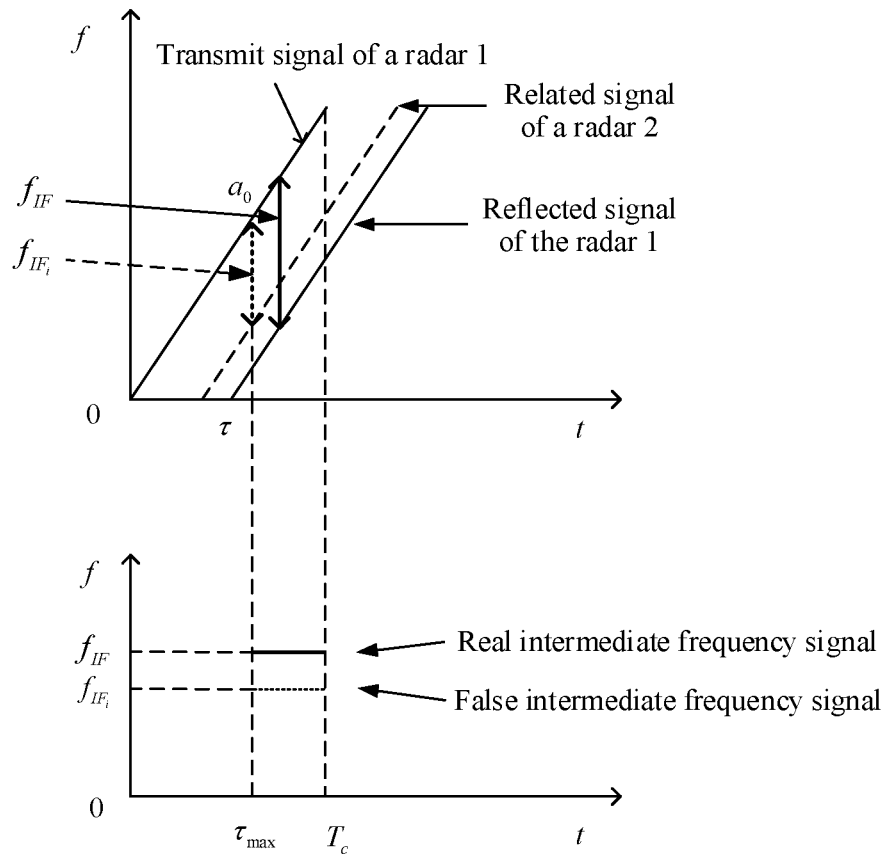
FIG. 7A and FIG. 7B are schematic diagrams of a possible false intermediate frequency signal according to an embodiment of this application.
Figure 7B:
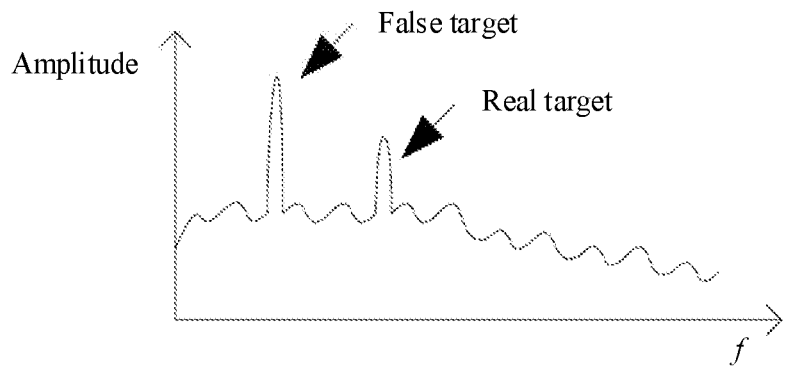

FIG. 7A and FIG. 7B are schematic diagrams of a possible false intermediate frequency signal. As shown in FIG. 7A, a radar 1 transmits a signal to a target object, and receives a reflected signal from the target object. However, in a time range in which the radar 1 transmits the signal and receives the reflected signal, a receive antenna of the radar 1 receives a transmit signal or a reflected signal (dashed line) of a radar 2. A signal waveform of the radar 1 is the same as that of the radar 2, and a frequency sweep bandwidth of the radar 1 is the same as that of the radar 2. In a time range in which the radar 1 transmits a signal but does not receive a reflected signal, the radar 1 detects a signal, indicated by a dashed line, of a corresponding frequency, and the radar 1 considers that a "target object 1" exists. The radar 1 starts to receive a reflected signal and detects the signal indicated by the dashed line and a reflected signal indicated by a solid line in a signal detection time range ($\tau_{max}$~$T_c$), and the radar 1 considers that both the "target object 1" and a "target object 2" exist. Therefore, the radar 1 mistakenly considers the received signal indicated by the dashed line as a reflected signal of an object in the front. In this case, a false intermediate frequency signal is generated. After fast Fourier transformation, spectrum analysis may be performed to find two peak values. As shown in FIG. 7B, each peak value is corresponding to one target object. The radar 1 mistakenly considers that the "target object 1" exists in the front, but actually the "target object 1" does not exist, which is also referred to as a "ghost" or "false alarm".

Figure 8A:
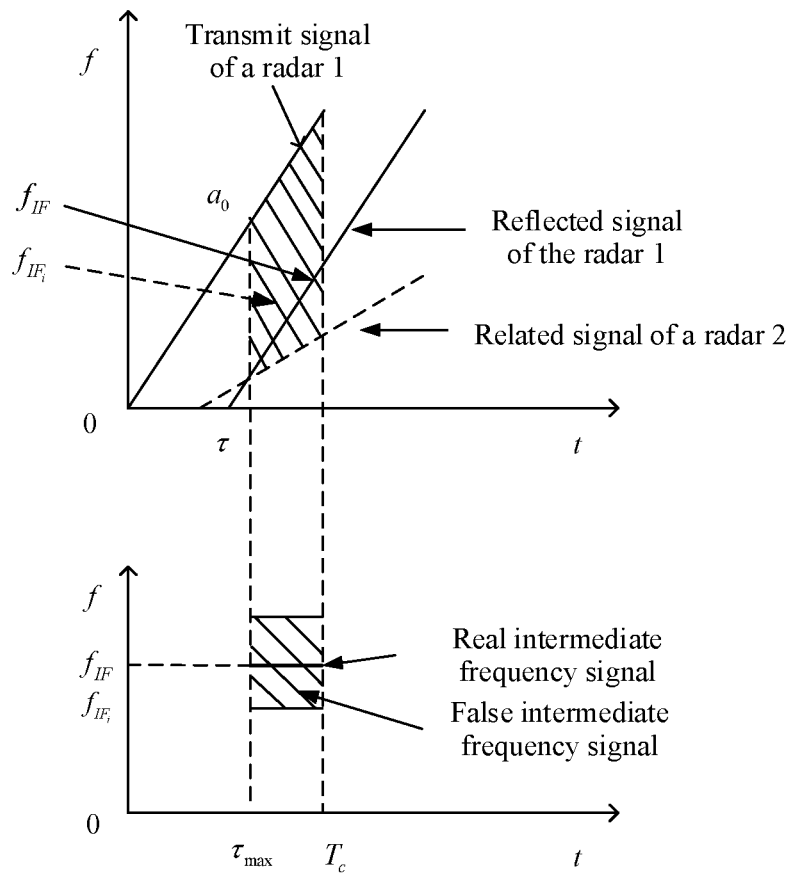
FIG. 8A and FIG. 8B are schematic diagrams of a result of submerging a target signal by an interference signal according to an embodiment of this application.
Figure 8B:
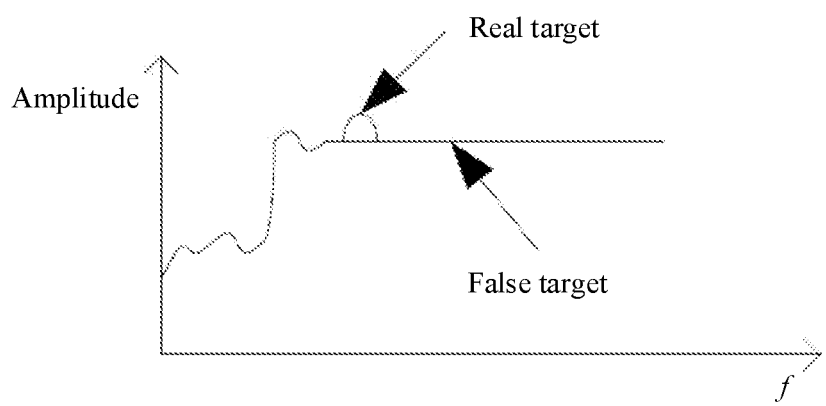

FIG. 8A and FIG. 8B are schematic diagrams of submerging a target signal by a possible interference signal. As shown in FIG. 8A, a radar 1 transmits a signal to a target object, and receives a reflected signal from the target object. However, in a time range in which the radar 1 transmits the signal and receives the reflected signal, a receive antenna of the radar 1 receives a transmit signal or a reflected signal (dashed line) of a radar 2. There is a slop difference between a signal waveform of the radar 1 and a signal waveform of the radar 2. In a signal detection time range ($\tau_{max}$~$T_c$), the radar 1 simultaneously detects a reflected signal of the radar 1 and a related signal of the radar 2. After frequency mixing is performed on the detected related signal of the radar 2 and the reflected signal of the radar 1, an intermediate frequency signal including various frequency components is generated. After fast Fourier transformation, as shown in FIG. 8B, an interference platform appears, so that a "protruding" degree of a real target is not enough. This brings a difficulty in detection and increases a possibility of missing detection. If the missing detection occurs, an automotive driving vehicle may mistakenly consider that there is no object in the front, and does not slow down or brake, so that a traffic accident occurs. This reduces driving safety of a vehicle.

Figure 9A:
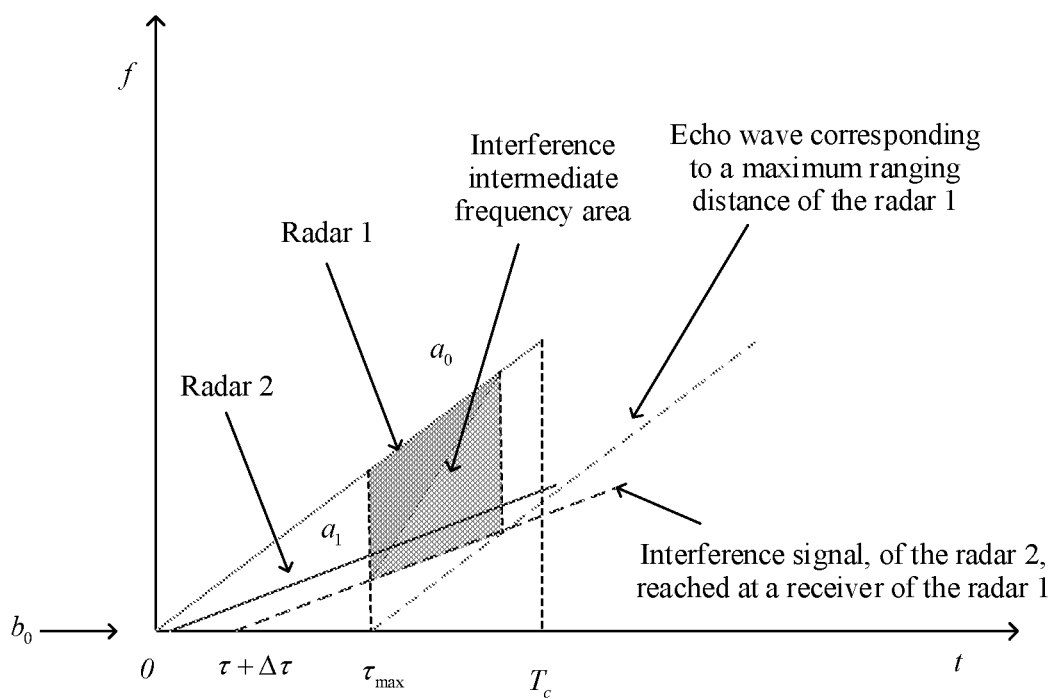
FIG. 9A is a schematic diagram of interference from a small slope radar in a large slope radar according to an embodiment of this application.

There is the slop difference between the signal waveform of the radar 1 and the signal waveform of the radar 2. If a slope of the waveform of the radar 1 is $a_0$, and a slope of the waveform of the radar 2 is $a_1$, the difference between the two slopes may be classified into the following two cases:

When $a_1 < a_0$, as shown in FIG. 9A, an interference platform problem may occur, thereby resulting in a problem of missing detection.

Figure 9B:
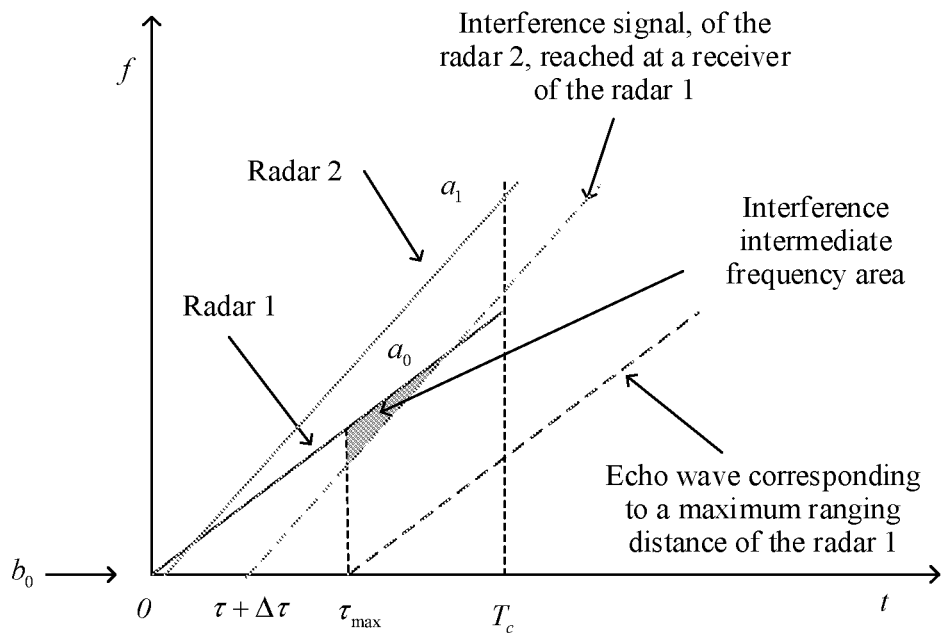
FIG. 9B is a schematic diagram of interference from a large slope radar in a small slope radar according to an embodiment of this application.

When $a_1 > a_0$, as shown in FIG. 9B, an interference platform problem may also occur, thereby resulting in a problem of missing detection.

It should be noted herein that, a person skilled in the art may know that a signal received at a moment or in a period of time may be the interference signal, or may be the reflected signal of the target object. A radar detection status can be clearly reflected by using a related change of time and a frequency of the transmit/reflected signal. Therefore, in subsequent descriptions of this application, a curve diagram reflecting a slope (a change range of a frequency in a unit time) of the transmit/reflected signal is mostly used to indicate mutual interference between radars.

Figure 10A:
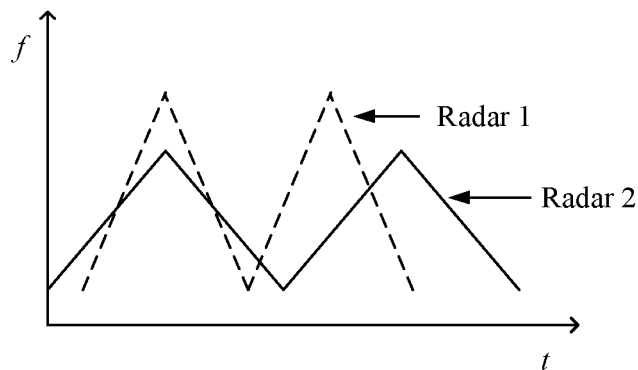
FIG. 10A and FIG. 10B are schematic diagrams of a possible solution according to an embodiment of this application.
Figure 10B:
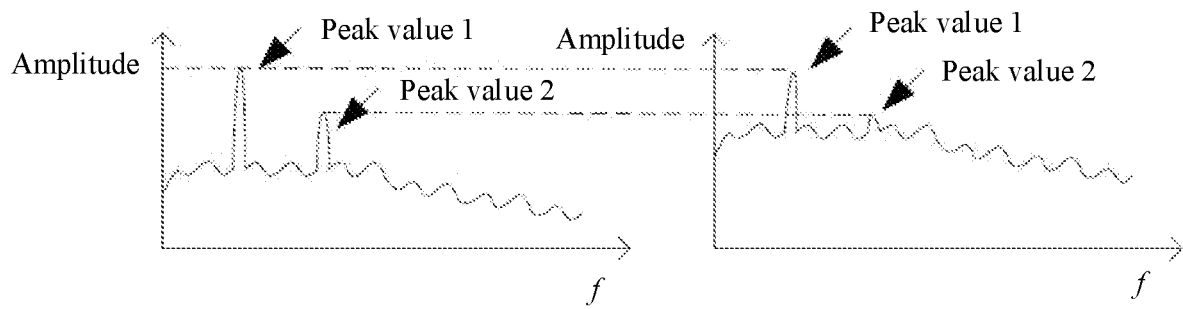

To resolve the foregoing problem, in a possible solution, different parameters such as a waveform slope and a period may be set for different radars. FIG. 10A is a schematic diagram of a possible solution. As shown in FIG. 10A, parameters such as a waveform slope and a transmit cycle of a radar 1 are inconsistent with those of a radar 2. In this way, even if the radar 1 receives a signal from the radar 2, because a waveform of the signal of the radar 2 differs, when a signal transmitted by the radar 1 and the signal of the radar 2 received by radar 1 are processed by a frequency mixer, in other words, when a difference between the signal transmitted by the radar 1 and the signal of the radar 2 received by radar 1 is calculated, an intermediate frequency signal with a constant frequency is not generated. This method can reduce an occurrence probability of a ghost because only an intermediate frequency signal with a constant frequency is reflected as a peak signal in spectrum analysis. However, if the radar 1 receives a signal from the radar 2, when a signal transmitted by the radar 1 and the signal of the radar 2 received by radar 1 are processed by the frequency mixer, an interference signal falls in a valid receive intermediate frequency bandwidth. This increases strength of the interference signal. After a level of the interference signal is raised, an original target signal is submerged by the interference signal, as shown in FIG. 10B. FIG. 10B is a schematic diagram of a possible false alarm result. A consequence is that an obstacle in front of the vehicle is not detected, and a false alarm is generated. This causes a severe impact on driving safety of the vehicle, especially safety of an unmanned vehicle.

Figure 11A:
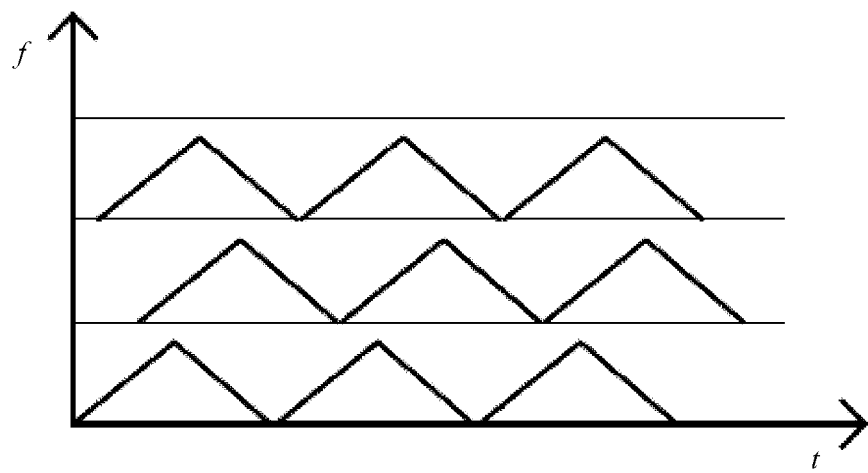
FIG. 11A and FIG. 11B are schematic diagrams of another possible solution according to an embodiment of this application.
Figure 11B:
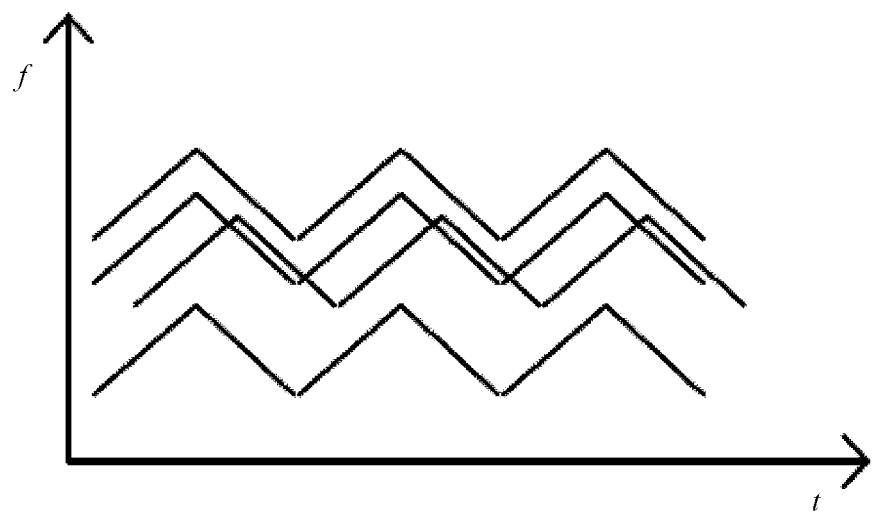

FIG. 11A is a schematic diagram of another possible solution. A technology used in this solution is a radar wave frequency shift technology. If a radar detects interference generated by another radar on a frequency sweep band of the radar, the radar jumps to another frequency sweep band to prevent interference between a plurality of radars. In the frequency shift technology, a frequency shift interval may be greater than a frequency sweep bandwidth of the radar, as shown in FIG. 11A. In this case, waveforms of radars are completely frequency division and do not overlap. However, setting of the frequency shift interval requires too many frequency domain resources to be occupied. However, frequency domain resources allocated to a vehicle-mounted radar are limited. Alternatively, the frequency shift technology is still used. However, after detecting interference generated by another radar in an operating frequency band, the radar performs random frequency shift, as shown in FIG. 11B. FIG. 11B is a schematic diagram of a yet another possible solution. In this case, interference can be reduced to a certain extent. However, completely random frequency shift may inevitably bring a result that an object is missed to be detected because a ghost occurs or strength of the interference signal increases due to too close waveforms of two radars in frequency domain after the frequency shift.

It should be noted that, in this embodiment of this application, when a value is compared with a threshold, an absolute value of a difference is used, and a problem of positive or negative is not considered. The difference itself can distinguish positive from negative. For example, a difference involved in determining of a positive intermediate frequency and a negative intermediate frequency may be distinguished positive from negative.

Therefore, this embodiment of this application provides a detection method. A radio signal (for example, a radar signal) is transmitted in a time division manner, to resolve a problem of mutual interference between a plurality of detection apparatuses, and further to improve time domain resource utilization. According to the method, mutual interference can be avoided or reduced between a relatively large quantity of detection apparatuses that can be supported as much as possible in same time domain resources.

For ease of description, in the following description of this application, an example in which the detection apparatus is a radar, for example, a millimeter-wave radar, is used to explain and describe the embodiments. However, in this application, the detection apparatus is not limited to only the millimeter-wave radar or the radar. Further, in this embodiment of this application, a plurality of detection apparatuses that separately send a radio signal in a corresponding time domain range in the L time domain ranges have a same frequency sweep period. For example, if a detection apparatus 1 sends a radio signal in a first time domain range in the L time domain ranges, and a detection apparatus 2 sends a radio signal in a second time domain range in the L time domain ranges, frequency sweep periods of the detection apparatus 1 and the detection apparatus 2 are the same.

It should be noted that, in the L time domain ranges, the plurality of detection apparatuses each transmit the radio signal in the corresponding time domain range. In the whole time domain of the corresponding time domain range, the detection apparatus needs to continuously transmit radio signals of a plurality of frequency sweep periods. In other words, a time domain length of each of the L time domain ranges is an integer multiple of the frequency sweep period. For example, if duration of a specific time domain range is 500 frequency sweep periods, a corresponding detection apparatus needs to transmit a radio signal of 500 frequency sweep periods in the time domain range. In some scenarios, time domain lengths of the L time domain ranges are the same. In some other scenarios, the time domain lengths of the L time domain ranges may not be exactly the same.

In addition, it should be noted that, in a possible case, the detection apparatus transmits a radio signal at specific transmit timing. However, due to a possible difference in an actual communication scenario, an environment, or a hardware device, an error may exist at an actual sending moment of the radio signal, and the error may also be referred to as a signal transmit error, for example, an error caused by precision of a global positioning system. In another possible case, in a production and manufacturing process, due to a difference in production and manufacturing, a different detection apparatus may have a slight error in signal transmission. In another case, an error may be caused by another reason. For all the foregoing possible errors, the design method provided in this application may be considered in specific implementation. To provide a relatively clear solution, these errors are ignored in the embodiments of this application, and the solution is described based on a unified standard and transmit timing. Compared with granularity consideration and timing precision requirement in a time domain range in this application, the foregoing error may also be ignored, and does not substantially affect implementation and beneficial effects of this embodiment of this application.

Figure 12:
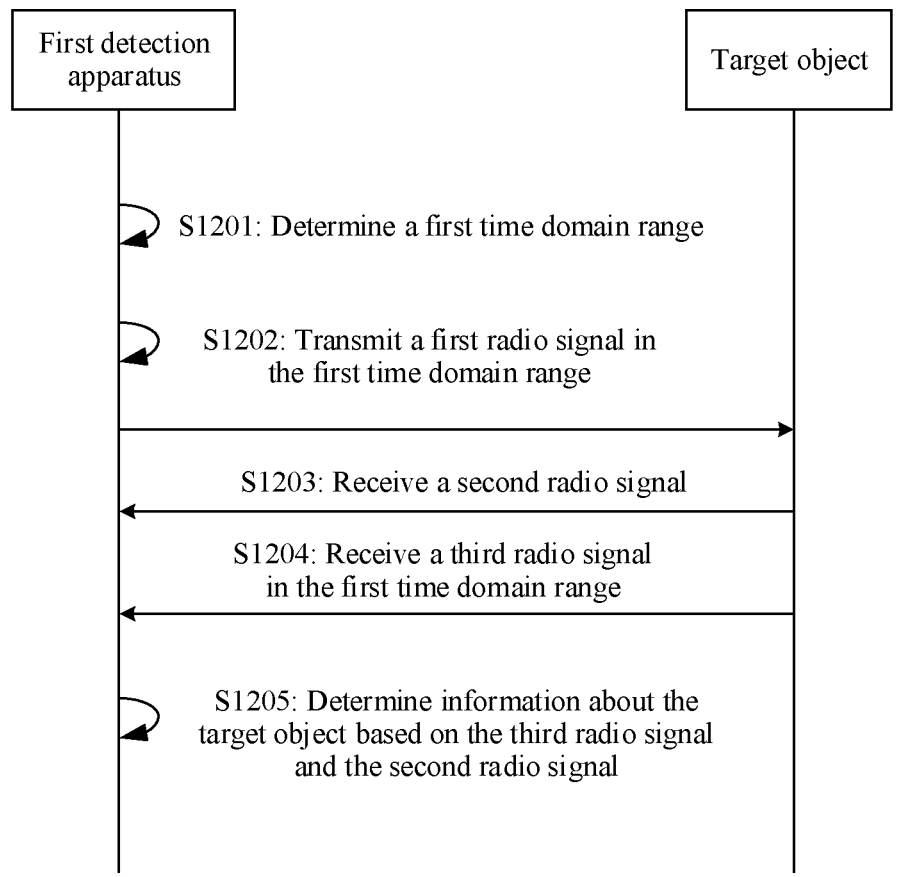
FIG. 12 is a schematic flowchart of a method for detecting a target object by using a radio signal according to an embodiment of this application.

FIG. 12 is a schematic flowchart of a possible method for detecting a target object by using a radio signal. The following describes, with reference to FIG. 12, an example of a method for detecting a target object by using a radio signal according to an embodiment of this application. The method may be applied to a first detection apparatus. It should be noted that the first detection apparatus may be a radar, or may be an apparatus integrated with a radar, or may be an apparatus independent of or integrated into a radar. For example, the first detection apparatus may be a group of chips independent of or integrated into a radar, or the first detection apparatus may be a group of modules or elements independent of or integrated into a radar, or the first detection apparatus may be a group of software modules, which are stored in a computer-readable storage apparatus. For ease of description, the following describes a solution by using an example in which the first detection apparatus is the radar. The method shown in FIG. 12 includes but is not limited to the following steps.

Step 1201: Determine a first time domain range, where the first time domain range is one of L time domain ranges.

In this embodiment of this application, the L time domain ranges may be referred to as one radio detection frame, and each of the L time domain ranges may be referred to as one radio detection subframe. Certainly, the L time domain ranges or each of the L time domain ranges may have another name. Regardless of how to define a name of the L time domain ranges or each of the L time domain ranges, the L time domain ranges refer to a time length of a relatively large granularity, and each time domain range refers to a time length of a relatively small granularity, where L is a positive integer greater than 1.

Any one of the L time domain ranges partially overlaps at least one of the other L−1 time domain ranges, and an absolute value of a difference between time domain start positions of any two of the L time domain ranges is not less than a first threshold F, and is less than a time domain length of a time domain range with a shortest time domain length in the L time domain ranges. In other words, any two of the L time domain ranges partially overlap (not completely overlap) in time domain, and an absolute value of a difference between time domain start positions of any two of the L time domain ranges is not less than the first threshold F. Completely overlapping herein means that the two time domain ranges are completely the same, or that one of the two time domain ranges is completely included in the other time domain range. In this design, resources can be avoided to be designed in a complete time division manner, to save time domain resources, and distribution density of detection apparatuses in time domain can be properly adjusted, so that as many detection apparatuses as possible each transmit a radio signal in a specific time domain length on a basis of ensuring high-performance communication.

Further, that an absolute value of a difference between time domain start positions of any two of the L time domain ranges is not less than the first threshold F further includes the following two cases: the absolute value of the difference is greater than or equal to the first threshold.

For example, time domain start positions of the L time domain ranges are evenly spaced in time domain. In this example, an absolute value of a difference between time domain start positions of "adjacent" time domain ranges in any two time domains of the L time domain ranges is equal to F, and an absolute value of a difference between time domain start positions of "non-adjacent" time domain ranges in any two time domains of the L time domain ranges is equal to X times of F, where X is a positive integer greater than 1. The following provides an example for description. It is assumed that the L time domain ranges further refer to three time domain ranges. The three time domain ranges are successively a first time domain range, a second time domain range, and a third time domain range according to time domain start positions from front to back. An absolute value of a difference between a time domain start position of the first time domain range and a time domain start position of the second time domain range is equal to 20 frequency sweep periods, an absolute value of a difference between the time domain start position of the second time domain range and a time domain start position of the third time domain range is equal to 20 frequency sweep periods, and an absolute value of a difference between the time domain start position of the first time domain range and the time domain start position of the third time domain range is equal to 40 frequency sweep periods. It can be learned that, in this specific example, F is equal to 20 frequency sweep periods.

For another example, time domain start positions of the L time domain ranges are not evenly spaced in time domain. In this example, if an absolute value of a difference between time domain start positions of two of the L time domain ranges is the smallest, the absolute value of the difference between the time domain start positions of the two time domain ranges is equal to F, and an absolute value of a difference between time domain start positions of any two time domain ranges except the two time domain ranges may be greater than F. The following provides an example for description. It is assumed that the L time domain ranges further refer to three time domain ranges. The three time domain ranges are successively a first time domain range, a second time domain range, and a third time domain range according to time domain start positions from front to back. An absolute value of a difference between a time domain start position of the first time domain range and a time domain start position of the second time domain range is equal to 20 frequency sweep periods, an absolute value of a difference between the time domain start position of the second time domain range and a time domain start position of the third time domain range is equal to 30 frequency sweep periods, and an absolute value of a difference between the time domain start position of the first time domain range and the time domain start position of the third time domain range is equal to 50 frequency sweep periods. It can be learned that, in this specific example, F is equal to 20 frequency sweep periods.

In specific implementation, at least one radio detection frame is distributed in a predefined or preconfigured manner in time domain. Further, the distribution may be defined or configured as a periodic or aperiodic manner. This is not limited in this application.

In an optional design, there are a plurality of radio detection frames in time domain, and the plurality of radio detection frames may be distributed in time domain at a specific period. Further, the plurality of radio detection frames is consecutive in time domain, or are inconsecutive in time domain.

In another optional design, there are a plurality of radio detection frames in time domain, and the plurality of radio detection frames may be distributed in time domain in an aperiodic manner. Further, at least two of the plurality of radio detection frames may be discontinuous in time domain.

When sending the radio signal, the detection apparatus may send the signal in a radio detection subframe in one or more radio detection frames. Different detection apparatuses are corresponding to different radio detection subframes in one radio detection frame. For example, a first detection apparatus sends a radio signal in a first radio detection subframe in a first radio detection frame, and a second detection apparatus sends a radio signal in a second radio detection subframe in the first radio detection frame.

In the foregoing design manner in which a plurality of time domain ranges partially overlap, a waste of time domain resources caused by completely separating frequency sweep periods of a plurality of detection apparatuses in time domain can be avoided, so that time domain resources can be effectively used, relatively high anti-interference performance can be implemented at a relatively low time domain resource cost, and communication of a larger quantity of detection apparatuses can be supported.

Figure 13:
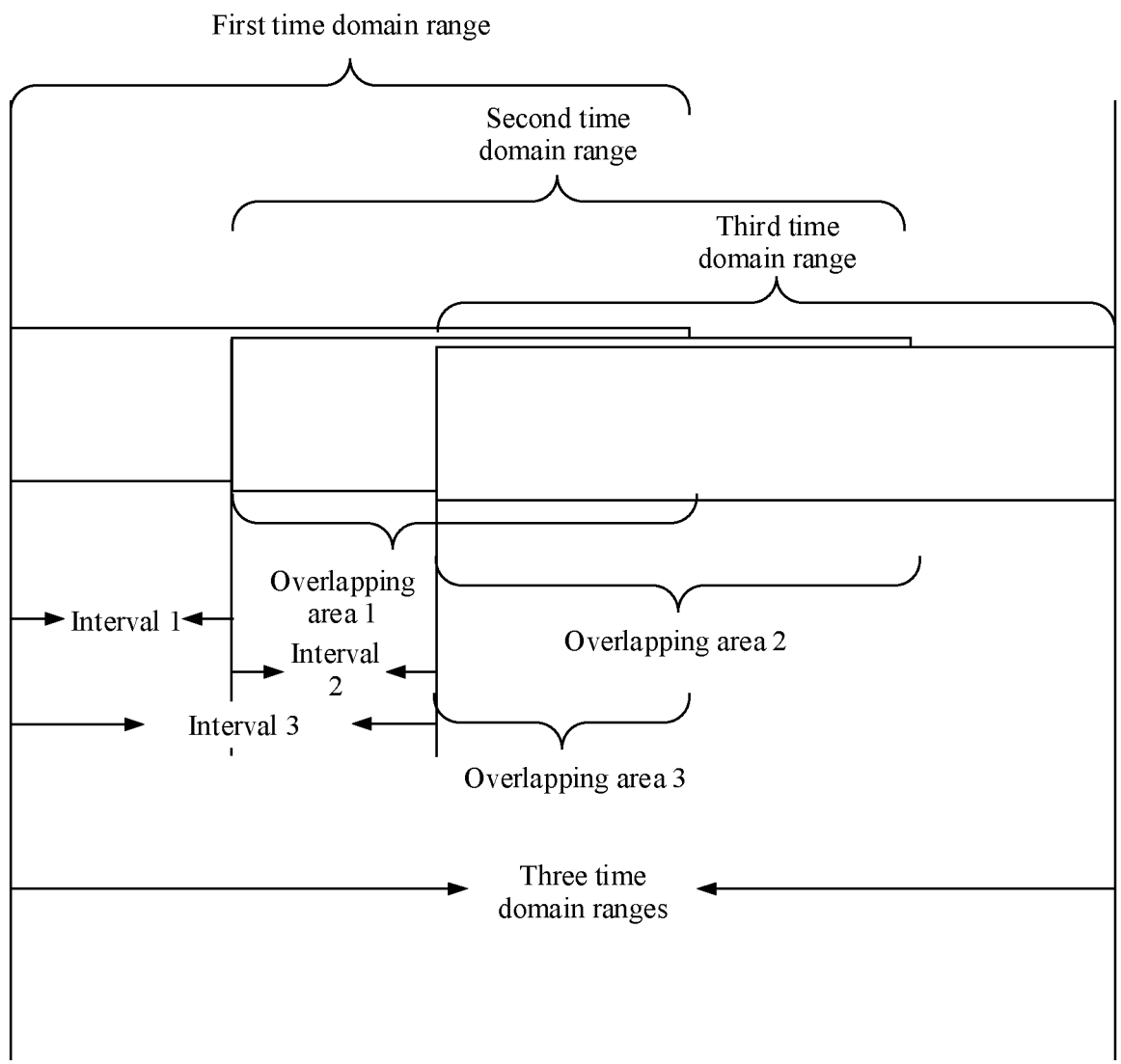
FIG. 13 is a schematic diagram of a relationship among three time domain ranges according to an embodiment of the present disclosure.

The following provides an example for description with reference to FIG. 13.

FIG. 13 shows an optional case in which L is equal to 3. When L is equal to 3, three time domain ranges may be respectively referred to as the first time domain range, the second time domain range, and the third time domain range. In the three time domain ranges, any one time domain range partially overlaps the other two time domain ranges. In FIG. 13, an overlapping area between the first time domain range and the second time domain range is an overlapping area 1, an overlapping area between the first time domain range and the third time domain range is an overlapping area 3, and an overlapping area between the second time domain range and the third time domain range is an overlapping area 2. In FIG. 13, an absolute value of a difference between time domain start positions of any two of the three time domain ranges is an integer multiple of a frequency sweep period and is not less than a first threshold F. An absolute value of a difference between a time domain start position of the first time domain range and a start position of the second time domain range is a length of an interval 1, an absolute value of a difference between a time domain start position of the second time domain range and a start position of the third time domain range is a length of an interval 2, and an absolute value of a difference between a time domain start position of a third time domain range and a start position of a first time domain range is a length of an interval 3. In this embodiment of this application, the length of the interval 1, the length of the interval 2, the length of the interval 3 is an integer multiple of the frequency sweep period and is not less than the first threshold F.

It should be noted that, it is assumed that the L time domain ranges sequentially include the first time domain range, the second time domain range, and the third time domain range in a time domain sequence. An absolute value of a difference between a time domain start position of the first time domain range and a time domain start position of the second time domain range is referred to as a first absolute value, and an absolute value of a difference between a time domain start position of the second time domain range and a time domain start position of the third time domain range is referred to as a second absolute value. In this case, the first absolute value may be equal to the second absolute value, or may be not equal to the second absolute value. However, both the first absolute value and the second absolute value each are an integer multiple of a frequency sweep period of a first radio signal.

In an optional solution, the first threshold F is greater than or equal to a frequency sweep period of the first radio signal, and the first threshold F is a positive integer multiple of the frequency sweep period of the first radio signal. For example, the first threshold F is equal to 2 times, 10 times, or another multiple of the frequency sweep period, and a specific quantity of times may be configured according to a requirement, or may be predefined in a standard or a protocol document. It should be noted that the first threshold F is set to be a positive integer multiple of the frequency sweep period, to ensure that a time domain range of interference measurement is greater than or equal to one frequency sweep period. This ensures a resolution of measuring an interference signal and ensures an interference cancellation effect. Further, an absolute value of a difference between time domain start positions of any two of the L time domain ranges is a positive integer multiple of the frequency sweep period.

In another optional solution, an absolute value of a difference between a time domain start position of any one of the L time domain ranges except the first time domain range and a time domain start position of the first time domain range is a positive integer multiple of the first threshold F, where the first threshold F is greater than or equal to the frequency sweep period of the first radio signal, and the first threshold F is a positive integer multiple of the frequency sweep period of the first radio signal. For example, if the first threshold F is 10 frequency sweep periods, an absolute value of a difference between a time domain start position of any time domain range other than the first time domain range in the L time domain ranges and the time domain start position of the first time domain range may be equal to 10 frequency sweep periods, 20 frequency sweep periods, or 50 frequency sweep periods. Further, optionally, time domain start positions of the L time domain ranges are evenly spaced, and an interval between a start position of each time domain range and a start position of a previous time domain range is a same value, for example, the foregoing 10 frequency sweep periods. The interval may be configured, or may be predefined in a standard or a protocol. The interval may differ for different types of detection apparatuses. Further, in an optional solution, an absolute value of a difference between time domain start positions of any two of the L time domain ranges is a positive integer multiple of the frequency sweep period.

For the foregoing L time domain ranges, it is described above that the detection apparatus generally sends radio signals in a plurality of frequency sweep periods in continuous duration. The continuous duration may be referred to as one time domain range or one radio detection subframe. In one radio detection frame (the L time domain ranges), the detection apparatus determines one time domain range and continuously transmits radio signals until the time domain range ends. A radio detection subframe in which the detection apparatus transmits a radio signal next time may be in another radio detection frame after the radio detection frame. The other radio detection frame and the radio detection frame may be consecutive in time domain, or the other radio detection frame may be a next radio detection frame in a plurality of radio detection frames configured periodically, or may be any possible radio detection frame. This further depends on a time when the detection apparatus is configured or triggered to continue to transmit the radio signal. There is also a plurality of possible designs for a format or a pattern of the L time domain ranges.

In a possible design, time domain lengths of all of the L time domain ranges are the same, and the time domain length is a positive integer multiple of a frequency sweep period of the first radio signal. Similarly, FIG. 13 is used as an example for description. A time domain length of the first time domain range, a time domain length of the second time domain range, and a time domain length of the third time domain range are the same, and each of the time domain lengths are an integral multiple of the frequency sweep period of the first radio signal, for example, 400 times, or 500 times. A specific quantity of times may be configured according to a requirement, for example, may be preconfigured or dynamically configured, or predefined in a protocol. In this design, a time domain length of a time domain range with a minimum time domain length in the L time domain ranges is a time domain length of any one of the L time domain ranges.

In another possible design, there are at least two time domain ranges with different time domain lengths in the L time domain ranges. Further, a time domain length of each time domain range is a positive integer multiple of the frequency sweep period of the first radio signal. In this possible design, optionally, the L time domain ranges may include time domain ranges with T types of time domain lengths. A time domain range of each type of time domain length is corresponding to a detection apparatus of a corresponding type. Alternatively, there are a plurality of types of detection apparatuses, and each type of detection apparatus is corresponding to a time domain range of a corresponding time domain length. A detection apparatus of a corresponding type can transmit a radio signal only in a time domain range of a corresponding time domain length. Further, optionally, each of the T types of time domain lengths is an integer multiple of the frequency sweep period of the first radio signal. For example, the L time domain ranges include three time domain ranges. A time domain length of the first time domain range is 200 frequency sweep periods, a time domain length of the second time domain range is 300 frequency sweep periods, and a time domain length of the third time domain range is 300 frequency sweep periods. The first time domain range is corresponding to one type of detection apparatus, the second time domain range and the third time domain range are corresponding to another type of detection apparatus. The other type of detection apparatus may determine, from the second time domain range and the third time domain range, a time domain range used to transmit a radio signal. T is a positive integer greater.

With reference to classification of the types of the detection apparatuses, in one possible case, there may be a plurality of types of detection apparatuses due to performance or a configuration of the detection apparatus itself. For example, duration for continuously transmitting radio signals by radars from different manufacturers may be different. This improves flexibility when a plurality of detection apparatuses is used together. In another possible case, because there is a plurality of possible application scenarios, detection apparatuses in different application scenarios are respectively configured or belong to corresponding types, and consequently lengths of time domain ranges in which radio signals are continuously transmitted are different. For example, in a specific scenario or road condition, a detection apparatus is configured or triggered to continuously send a radio signal for a relatively long time (a radio detection subframe or a time domain range is relatively long). In another scenario or road condition, the detection apparatus is configured or triggered to continuously send a radio signal for a relatively short time (a radio detection subframe or a time domain range is relatively short). Specific classification of the types of the detection apparatuses is not limited in this application.

In addition, in the L time domain ranges, time domain positions except the first time domain range are consecutive or inconsecutive. FIG. 13 is also used as an example for description. If the first time domain range is the first time domain range in FIG. 13, time domain positions except the first time domain range are continuous. If the first time domain range is the second time domain range in FIG. 13, time domain positions except the first time domain range are discontinuous. In this embodiment of this application, that the first time domain range is which time domain range in the L time domain ranges is not limited herein. Optionally, the first detection apparatus may determine one time domain range from the L time domain ranges based on a configuration, and the determined time domain range is the first time domain range. Further, the configuration may be configured time domain range, or may be a predefined or preconfigured rule or policy. Optionally, the first detection apparatus may randomly determine a time domain range from the L time domain ranges to send a radio signal.

Step S1202: Transmit a first radio signal in the first time domain range.

Optionally, the foregoing method may further include the following step.

Step S1203: Receive a second radio signal at a time domain position other than the first time domain range in the L time domain ranges.

Further, the second radio signal may be one or more second radio signals, where the second radio signal comes from at least one second detection apparatus (for example, one second detection apparatus or a plurality of second detection apparatuses). The second detection apparatus is different from the first detection apparatus, for example, the first detection apparatus is a vehicle-mounted radar on a specific vehicle, and the second detection apparatus is a vehicle-mounted radar on another vehicle. In a case in which there are a plurality of second detection apparatuses, the second radio signal is a plurality of second radio signals that are respectively corresponding to the plurality of second detection apparatuses. Optionally, a time domain position other than the first time domain range in the L time domain ranges includes a time domain position in at least one second time domain range, the at least one second time domain range belongs to the L time domain ranges, and the at least one second time domain range is corresponding to the at least one second detection apparatus. The second detection apparatus herein is different from the first detection apparatus, but types of the first detection apparatus and the second detection apparatus may be the same or different. In a case in which types of the first detection apparatus and the second detection apparatus are the same, time domain lengths of time domain ranges respectively corresponding to the first detection apparatus and the second detection apparatus are the same.

The following uses an example for description.

For example, if the second radio signal comes from two second detection apparatuses, which are referred to as a second detection apparatus 1 and a second detection apparatus 2, the first detection apparatus needs to receive the second radio signal in two second time domain ranges (the two time domain ranges partially overlap in time domain). Further, a radio signal of the second detection apparatus 1 is received in one of the two time domain ranges, and a radio signal of the second detection apparatus 2 is received in the other of the two time domain ranges. The radio signals from the second detection apparatus 1 and the second detection apparatus 2 form the second radio signal.

For another example, if the second radio signal comes from three second detection apparatuses, which are referred to as a second detection apparatus 1, a second detection apparatus 2, and a second detection apparatus 3, the first detection apparatus needs to receive the second radio signal in three second time domain ranges (which are respectively referred to as a second time domain range 1, a second time domain range 2, and a second time domain range 3, and any two of the second time domain ranges partially overlap in time domain). Further, a radio signal of the second detection apparatus 1 is received in the second time domain range 1, a radio signal of the second detection apparatus 2 is received in the second time domain range 2, and a radio signal of the second detection apparatus 3 is received in the second time domain range 3. The radio signals from the second detection apparatus 1, the second detection apparatus 2 and the second detection apparatus 3 form the second radio signal.

For still another example, if the second radio signal comes from four second detection apparatuses, which are referred to as a second detection apparatus 1, a second detection apparatus 2, a second detection apparatus 3, and a second detection apparatus 4, the first detection apparatus needs to receive the second radio signal in four second time domain ranges (which are respectively referred to as a second time domain range 1, a second time domain range 2, a second time domain range 3, and a second time domain range 4, and any two of the second time domain ranges partially overlap in time domain). Further, a radio signal of the second detection apparatus 1 is received in the second time domain range 1, a radio signal of the second detection apparatus 2 is received in the second time domain range 2, a radio signal of the second detection apparatus 3 is received in the second time domain range 3, and a radio signal of the second detection apparatus 4 is received in the second time domain range 4. The radio signals from the second detection apparatus 1, the second detection apparatus 2, the second detection apparatus 3, and the second detection apparatus 4 form the second radio signal.

When the second radio signal comes from another quantity of second detection apparatuses, for a relationship among the second radio signal, the second detection apparatus, and the second time domain range, refer to the foregoing example description. Details are not described herein again.

Step S1204: Receive a third radio signal in the first time domain range, where the third radio signal includes a reflected signal of the first radio signal.

Further, the first detection apparatus transmits the first radio signal in the first time domain range, and receives the radio signal. For ease of subsequent description, the radio signal received in the first time domain range may be referred to as the third radio signal. It may be understood that, after being transmitted, the first radio signal is reflected by some objects such as a vehicle, a building, a stone, and the like, and therefore the third radio signal includes the reflected signal of the first radio signal. In addition, the first time domain range and the at least one second time domain range have an overlapping area, and a radio signal transmitted by at least one corresponding second detection apparatus may exist in the at least one second time domain range. In other words, the radio signal transmitted by the second detection apparatus exists at the overlapping area. To be specific, the radio signal transmitted by the second detection apparatus exists in the third radio signal received in the first time domain range, and a signal that reaches at a receiver of the first detection apparatus and that is formed by reflecting or refracting, by another target object, the radio signal transmitted by the second detection apparatus may also exist in the third radio signal received in the first time domain range. For the first detection apparatus that transmits the first radio signal in the first time domain range, the radio signal that is transmitted by the second detection apparatus and that is received during this period is an interference signal, and the interference signal affects information (such as an angle or a distance) of measuring, by the first detection apparatus, the target object based on the first radio signal.

Similarly, FIG. 13 is used as an example. If the first detection apparatus transmits the first radio signal in the first time domain range, and the second detection apparatus transmits the radio signal in the second time domain range, in the first time domain range, a signal received in time domain represented by the interval 1 includes the reflected signal of the first radio signal, and a signal received in time domain represented by the overlapping area 1 includes the reflected signal of the first radio signal and the radio signal transmitted by the second detection apparatus in the overlapping area 1 (because the overlapping area 1 also belongs to the second time domain range). Therefore, in the first time domain range, the third radio signal received by the first detection apparatus includes the reflected signal of the first radio signal transmitted by the first detection apparatus, further includes the radio signal transmitted by the second detection apparatus, and may further include a signal that reaches at a receiver of the first detection apparatus and that is formed by reflecting or refracting, by another target object, the radio signal transmitted by the second detection apparatus.

Step S1205: Determine information about the target object based on the third radio signal and the second radio signal.

Further, an interference signal other than the reflected signal of the first radio signal in the third radio signal is estimated based on the second radio signal (the second radio signal is used as an estimated signal of the interference signal). Then, interference cancellation is performed on the third radio signal, to remove or weaken the interference signal, so as to obtain the reflected signal of the first radio signal. Then, an intermediate frequency signal is determined based on the reflected signal of the first radio signal and the first radio signal currently transmitted, and then information about the target object is determined based on the intermediate frequency signal, for example, information such as a distance from the target object, an angle from the target object, and a radial relative velocity from the target object.

In an optional solution, a period of duration includes a plurality of time periods, time lengths of any two time periods of the plurality of time periods are the same, and the two time periods do not overlap with each other. In this embodiment of this application, each of the plurality of time periods includes the L time domain ranges described above. In other words, each time period is the radio detection frame described above. Before transmitting the radio signal, the first detection apparatus first selects, according to a predefined selection policy, or randomly selects one radio selection frame from the plurality of time periods, or preconfigures the radio detection frame for sending the radio signal by the first detection apparatus. The first radio detection frame selects, according to a predefined policy, or randomly selects one radio detection subframe (namely, the first time domain range) from the one radio detection frame, or preconfigures one radio detection subframe in the one radio detection frame for sending the radio signal by the first detection apparatus. The first radio detection frame transmits the radio signal, namely, the first radio signal in the selected or preconfigured radio detection subframe.

The foregoing describes a principle of the technical solutions of this application. The following uses some specific parameters as an example for description.

Optional Embodiment 1: (In a scenario involved in this embodiment, lengths of radio detection subframes included in each radio detection frame are the same.)

Figure 14:
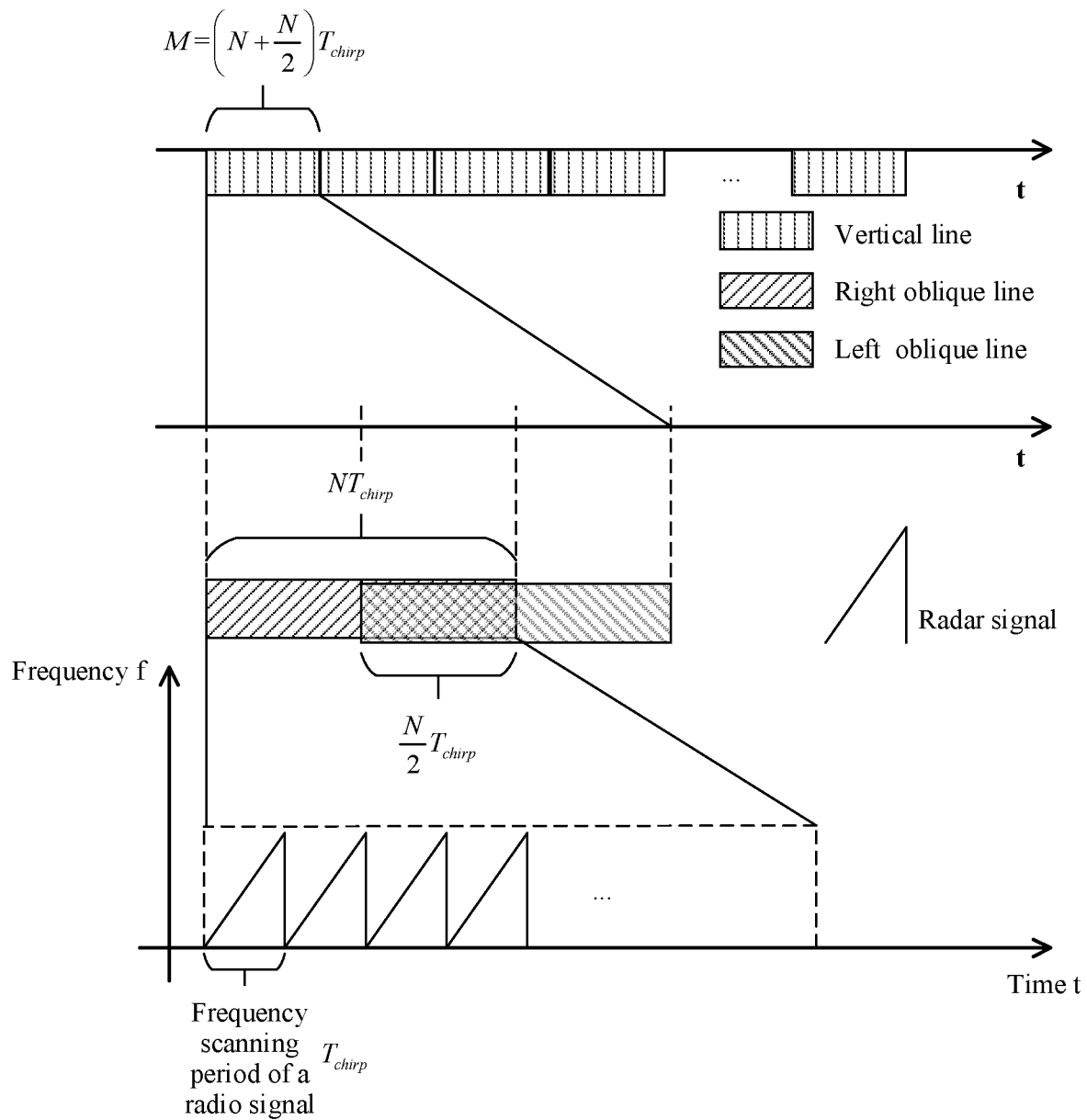
FIG. 14 is a schematic structural diagram of a time domain range according to an embodiment of the present disclosure.

Referring to FIG. 14, it is assumed that each radio detection frame includes two radio detection subframes, where one radio detection subframe is represented by using a left oblique line grid, and the other radio detection subframe is represented by using a right oblique line grid, where a length M of each radio detection frame is equal to 750 frequency sweep periods (a vertical line area in FIG. 14). For ease of description, the 750 frequency sweep periods may be numbered, and numbers from the first to the 750th are sequentially 0, 1, 2, 3, . . . , 748, and 749. A length of each radio detection subframe is equal to 500 frequency sweep periods, that is $NT_{chirp}$, and time domain start positions of the two radio detection subframes are spaced by 250 frequency sweep periods, that is $0.5N*T_{chirp}$. Correspondingly, a time domain length in which one radio detection subframe overlaps with another radio detection subframe is $0.5N*T_{chirp}$ (for example, an area in which the left oblique line grid intersects the right oblique line grid in FIG. 14). It can be learned that the time domain length M of each radio detection frame is equal to $1.5N*T_{chirp}$. If a transmit cycle of a radio signal is 10 microseconds (μs), duration of a radio detection subframe is 5 milliseconds (ms), duration of a radio detection frame is 7.5 ms, and duration in which the two radio detection subframes overlap in time domain is 2.5 ms. If a first detection apparatus outputs a measurement result every 50 ms, 52.5 ms may be used as a measurement result output period of the first detection apparatus. In this case, there are seven radio detection frames of 7.5 ms in 52.5 ms, namely, 14 radio detection subframes. The first detection apparatus may select one radio detection subframe (namely, a first time domain range) from the 14 radio detection subframes as a working period of the first detection apparatus. In other words, the first detection apparatus transmits a first radio signal and receives a third radio signal in the working period.

Figure 15:
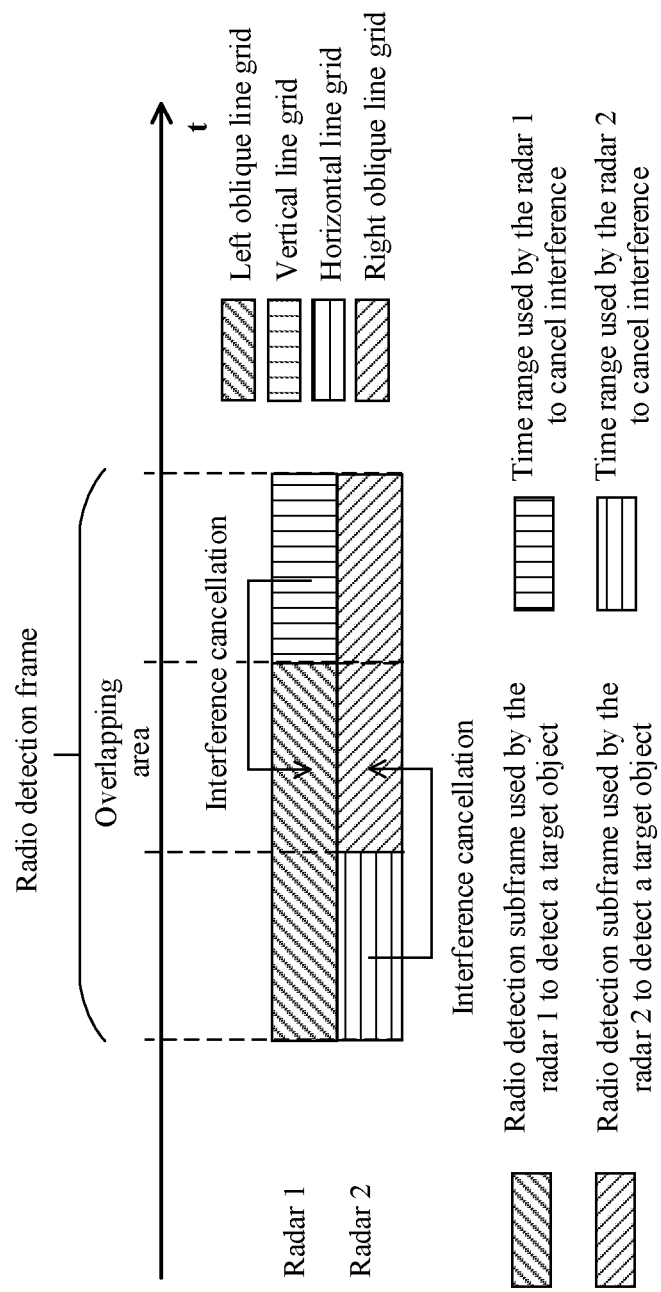
FIG. 15 is a schematic diagram of radar interference cancellation according to an embodiment of the present disclosure.

If the first detection apparatus transmits the first radio signal and receives the third radio signal in the former radio detection subframe of the two radio detection subframes, and a second detection apparatus transmits a fourth radio signal and receive a fifth radio signal in the latter radio detection subframe of the two radio detection subframes. In this case, the first detection apparatus is a radar 1 in FIG. 15, and a target object is detected by using frequency sweep periods numbered 0 to 499 in the 750 frequency sweep periods. The second detection apparatus is a radar 2 in FIG. 15, and a target object is detected by using frequency sweep periods 250 to 749 in the 750 frequency sweep periods. In this case, in the former radio detection subframe, an overlapping area includes a signal received by the first detection apparatus through propagation of the radio signal transmitted by the second detection apparatus. As shown in FIG. 15, a specific quantity of the signals received by the first detection apparatus through propagation of the radio signal transmitted by the second detection apparatus may be determined by using a radio signal (namely, the second radio signal) transmitted by the second detection apparatus in time domain represented by a vertical line grid. After determining the signal received by the first detection apparatus through propagation of the radio signal transmitted by the second detection apparatus, the first detection apparatus may cancel, by using the radio signal, an interference part in the radio signal (namely, the third radio signal) received by the first detection apparatus in the former radio detection subframe.

A specific interference cancellation manner may be as follows. Referring to FIG. 15, the first detection apparatus performs frequency mixing on the signal received in time domain represented by the vertical line grid and a local-frequency signal of the first detection apparatus, to obtain an interference intermediate frequency signal.

If a slope of a frequency-modulated continuous wave transmitted by the first detection apparatus is the same as a frequency change rate of a frequency-modulated continuous wave transmitted by the second detection apparatus, the interference intermediate frequency signal $S_{IF,n}^{Rx,i}(u)$ is shown in a formula (1.13):

$$S_{IF,n}^{Rx,i}(u) = A'_i \exp(j2\pi f_d^i n T_c) \qquad (1.13)$$

$$\exp(j2\pi f_c \tau_i) \times \exp\left\{j2\pi \left[\begin{array}{c}(a_0\tau_i + f_d^i)u - \\ \dfrac{a_0}{2}\tau_i^2 + b_0\tau_i + \varphi_0 - \varphi_i\end{array}\right]\right\} =$$

$$A'_i \times (j\Phi_n^i) \times \exp\{j2\pi[(a_0\tau_i + f_d^i)u]\},$$

$$\tau_i \le u < T_c, \quad n = 0, 1, 2, \ldots, N-1$$

In the formula (1.13), $$\Phi_n^i = 2\pi\left(f_c\tau_i - \dfrac{a_0}{2}\tau_i^2 + b_0\tau_i + \varphi_0 - \varphi_i + f_d^i n T_c\right),$$

$\Phi_n^i$ is a phase of an intermediate frequency signal formed by an $i^{th}$ interference radio signal in an $n^{th}$ frequency sweep period. $A'_i$ is a signal amplitude after a transmit antenna gain, target reflection (if there is direct interference, the target reflection does not exist, and if there is non-direct interference, there may be a reflection, of the interference signal, from another target), propagation loss, and a receive antenna gain. $\varphi_i$ is an initial phase of the $i^{th}$ interference radio signal. $f_d^i$ is a Doppler frequency formed by the $i^{th}$ interference radar signal because of a radial relative velocity between the target object and the first detection apparatus. $\tau_i$ is a delay from a time point at which the $i^{th}$ interference radio signal is transmitted by a transmitter to a time point at which the signal is received by a receiver of an interference radar (for example, the first detection apparatus). $f_c$ is a carrier frequency of a radio signal transmitted by the $i^{th}$ interference radar, $a_0$ is a slope of a frequency-modulated continuous wave of the interference radar, $b_0$ is an intercept of the frequency-modulated continuous wave of the interference radar, and $T_c$ is a period of the frequency-modulated continuous wave of the interference radar. N is a total quantity of periods in which the interference radar continuously transmits the frequency-modulated continuous wave. $\varphi_0$ is an initial phase of the local-frequency signal of the first detection apparatus.

If a slope of a frequency-modulated continuous wave transmitted by the first detection apparatus is different from a frequency change rate of a frequency-modulated continuous wave transmitted by the second detection apparatus, the interference intermediate frequency signal $S_{IF,n}^{Rx,i}(u)$ in the $n^{th}$ frequency sweep period is shown in a formula (1.14):

$$S_{IF,n}^{Rx,i}(u) = A'_i \exp(j2\pi f_d^i n T_c) \exp(j2\pi f_c \tau_i) \times \qquad (1.14)$$

$$\exp\left\{j2\pi \left[\begin{array}{c}\left(\dfrac{a_o - a_i}{2}\right)u^2 + (a_i\tau_i + f_d^i)u - \\ \dfrac{a_i}{2}\tau_i^2 + b_o\tau_i + \varphi_o - \varphi_i\end{array}\right]\right\} =$$

$$A'_i \times \exp(j\Phi_n^i) \times \exp\left\{j2\pi\left[\left(\dfrac{a_0 - a_i}{2}\right)u^2 + (a_i\tau_i + f_d^i)u\right]\right\},$$

$$\tau_i \le u < T_c, n = 0, 1, \ldots, N-1$$

In the formula (1.14), $$\Phi_n^i = 2\pi\left(f_c\tau_i - \dfrac{a_i}{2}\tau_i^2 + b_0\tau_i + \varphi_0 - \varphi_i + f_d^i n T_c\right),$$

$\Phi_n^i$ is a phase of an intermediate frequency signal formed by an $i^{th}$ interference radio signal in an $n^{th}$ frequency sweep period. $A'_i$ is a signal amplitude after a transmit antenna gain, target reflection (if there is direct interference, the target reflection does not exist, and if there is non-direct interference, there may be a reflection, of the interference signal, from another target), propagation loss, and a receive antenna gain. $\varphi_i$ is an initial phase of the $i^{th}$ interference radio signal. $f_d^i$ is a Doppler frequency formed by the $i^{th}$ interference radar signal because of a radial relative velocity between the target object and the first detection apparatus. $\tau_i$ is a delay from a time point at which the $i^{th}$ interference radio signal is transmitted by a transmitter to a time point at which the signal is received by a receiver of an interference radar (for example, the first detection apparatus). $f_c$ is a carrier frequency of a radio signal transmitted by the interference radar, $a_0$ is a slope of a frequency-modulated continuous wave of the interference radar, $b_0$ is an intercept of the frequency-modulated continuous wave of the interference radar, and $T_c$ is a period of the frequency-modulated continuous wave of the interference radar. N is a total quantity of periods in which the interference radar continuously transmits the frequency-modulated continuous wave. $a_i$ is a slope of the $i^{th}$ interfering radar signal, and $\varphi_0$ is an initial phase of the local-frequency signal of the first detection apparatus.

Fourier transformation is performed on a phase sequence, at a same time sampling point, of interference intermediate frequency signals in a plurality of consecutive periods in time domain represented by the $\Phi_n^i$ vertical line grid based on the formula (1.13) or the formula (1.14), to obtain a phase difference $\Delta\Phi_i$ of the interference intermediate frequency signals at the same time sampling point. The phase difference $\Delta\Phi_i$ is also a phase difference of radio signals in two adjacent periods of the interference signal received by the first detection apparatus. It is assumed that in the $n^{th}$ frequency sweep period in time domain represented by the vertical line grid, an interference radio frequency signal (equivalent to the foregoing second radio signal) received by the first detection apparatus from the second detection apparatus is $S_{RF}^{Rx,i}(u)$, $\tau_i \le T_c$, $n=500, 501, \ldots, 749$, and in an $n^{th}$ frequency sweep period in time domain represented by an overlapping area, a radio signal (a part of the third radio signal) received by the first detection apparatus is $S_{RF,n,1}^{Rx,overlap}(u)$, $\tau_i \le u < T_c$, $n=250, 251, \ldots, 499$, in time domain represented by the overlapping area, a wanted radio signal $S_{RF,n,1}^{Rx,clean}(u)$, after interference cancellation, that is in the $n^{th}$ frequency sweep period and that is received by the first detection apparatus is shown in a formula (1.15):

$$S_{RF,n,1}^{Rx,clean}(u) = S_{RF,n,1}^{Rx,overlap}(u) - S_{RF,q,1}^{Rx,i}(u) \exp[-j(q-n)\Delta\Phi_i], \tau_i \le u < T_c, n=250, 251, \ldots, 499, q=500, 501, \ldots, 749 \qquad (1.15)$$

In actual application, q in the formula (1.15) is set to a value. In other words, the first detection apparatus may substitute an interference radar radio frequency signal received in a specific period in time domain represented by the vertical line grid into the formula (1.15), and traverse radio-frequency signals received in all periods in the overlapping area to cancel interference.

If the first detection apparatus transmits the first radio signal and receives the third radio signal in the latter radio detection subframe of the two radio detection subframes, and the second detection apparatus transmits a fourth radio signal and receive a fifth radio signal in the former radio detection subframe of the two radio detection subframes. In this case, the first detection apparatus is a radar 2 in FIG. 15, and a target object is detected by using frequency sweep periods numbered 250 to 749 in the 750 frequency sweep periods. The second detection apparatus is a radar 1 in FIG. 15, and a target object is detected by using frequency sweep periods 0 to 499 in the 750 frequency sweep periods. In this case, in the latter radio detection subframe, an overlapping area includes a signal received by the first detection apparatus through propagation of the radio signal transmitted by the second detection apparatus. As shown in FIG. 15, a specific quantity of the signals received by the first detection apparatus through propagation of the radio signal transmitted by the second detection apparatus may be determined by using a radio signal (namely, the second radio signal) transmitted by the second detection apparatus in time domain represented by a horizontal line grid. After determining the signal received by the first detection apparatus through propagation of the radio signal transmitted by the second detection apparatus, the first detection apparatus may cancel, by using the radio signal, an interference part in the radio signal (namely, the third radio signal) received by the first detection apparatus in the former radio detection subframe.

For example, it is assumed that in an $n^{th}$ frequency sweep period in time domain represented by the horizontal line grid, an interference radio frequency signal (equivalent to the foregoing second radio signal) received by the first detection apparatus from the second detection apparatus is $S_{RF,n,1}^{Rx,i}(u)$, $\tau_i \leq u < T_c$, $n=0, 1, \ldots, 249$, and in an $n^{th}$ frequency sweep period in time domain represented by an overlapping area, a radio signal (equivalent to the overlapping part of the third radio signal) received by the first detection apparatus is $S_{RF,n,1}^{Rx,overlap}(u)$, $\tau_i \leq u < T_c$, $n=250, 251, \ldots, 499$, in time domain represented by the overlapping area, a wanted radio signal $S_{RF,n,1}^{Rx,clean}(u)$, after interference cancellation, that is received by the first detection apparatus is shown in a formula (1.16):

$$S_{RF,n,1}^{Rx,clean}(u) = S_{RF,n,1}^{Rx,overlap}(u) - S_{RF,q,1}^{Rx,i}(u)\exp[-j(n-q)\Delta\Phi_i], \tau_i \leq u < T_c, n=250,251,\ldots,499, q=0,1,\ldots,249 \quad (1.16)$$

In actual application, q in the formula (1.16) is set to a value. In other words, the first detection apparatus may substitute an interference radar radio frequency signal received in a specific period in time domain represented by the vertical line grid into the formula (1.16), and traverse radio-frequency signals received in all periods in the overlapping area to cancel interference.

After obtaining the radio signal after interference cancellation (namely, a signal after interference cancellation of the third radio signal), the first detection apparatus determines the intermediate frequency signal based on the radio signal and the transmitted radio signal, and determines information (for example, information such as a distance from the target object, an angle from the target object, and a radial relative velocity from the target object) about the target object based on the intermediate frequency signal.

Optional Embodiment 2: (In a scenario involved in this embodiment, lengths of radio detection subframes included in each radio detection frame are the same.)

Figure 16:
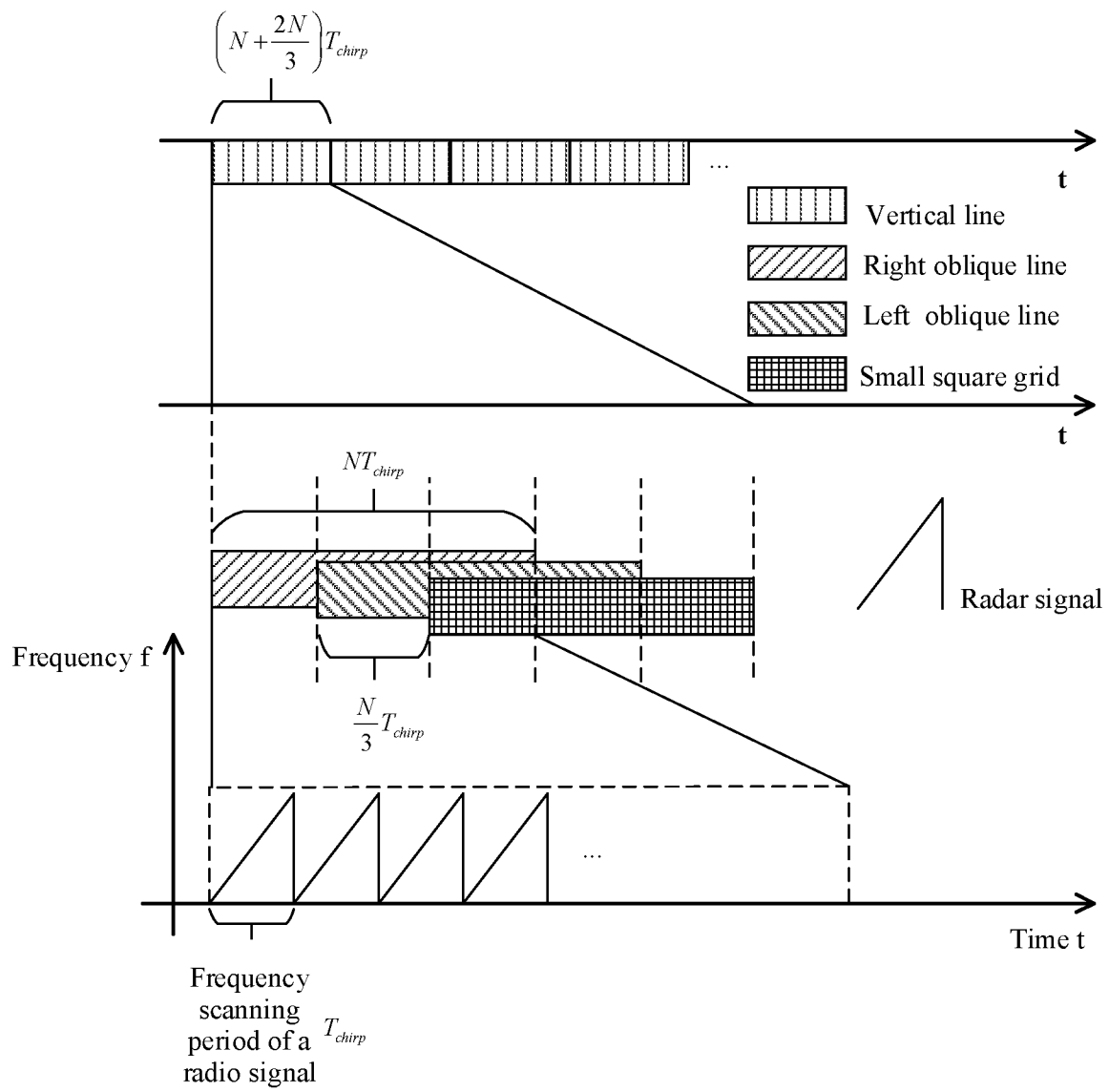
FIG. 16 is a schematic structural diagram of a time domain range according to an embodiment of the present disclosure.

Referring to FIG. 16, it is assumed that each radio detection frame includes three radio detection subframes. The first radio detection subframe 1601 is represented by using a right oblique line grid, the second radio detection subframe 1602 is represented by using a left oblique line grid, and the third radio detection subframe is represented by a small square grid 1603, where a length M of each radio detection frame is equal to 1000 frequency sweep periods (a vertical line area in FIG. 16). For ease of description, the 1000 frequency sweep periods may be numbered, and numbers from the first to the 1000th are sequentially 0, 1, 2, 3, ..., 998, and 999. A length of each radio detection subframe is equal to 600 frequency sweep periods, that is $NT_{chirp}$, and time domain start positions of the three radio detection subframes are spaced by 200 frequency sweep periods, that is ⅓$N*T_{chirp}$. Correspondingly, an overlapping time domain length between any two adjacent radio detection subframes in time domain is ⅔ $N*T_{chirp}$ (for example, an area in which the left oblique line grid intersects the right oblique line grid in FIG. 16, and an area in which the left oblique line grid intersects the small square grid in FIG. 16). It can be learned that the time domain length M of each radio detection frame is equal to 5/3$N*T_{chirp}$. If a transmit cycle of a radio signal is 10 μs, duration of a radio detection subframe is 6 ms, and duration of a radio detection frame is 10 ms. A length of an overlapping area between the first radio detection subframe 1601 and the second radio detection subframe 1602 is 4 ms, a length of an overlapping area of the first radio detection subframe 1601 and the third radio detection subframe 1603 is 2 ms, and a length of an overlapping area of the second radio detection subframe 1602 and the third radio detection subframe 1603 is 4 ms. If a first detection apparatus outputs a measurement result every 50 ms, 50 ms may be used as a measurement result output period of the first detection apparatus. In this case, there are five radio detection frames of 10 ms in 50 ms, namely, 15 radio detection subframes. The first detection apparatus may select one radio detection subframe (namely, a first time domain range) from the 15 radio detection subframes as a working period of the first detection apparatus. In other words, the first detection apparatus transmits a first radio signal and receives a third radio signal in the working period.

Figure 17:
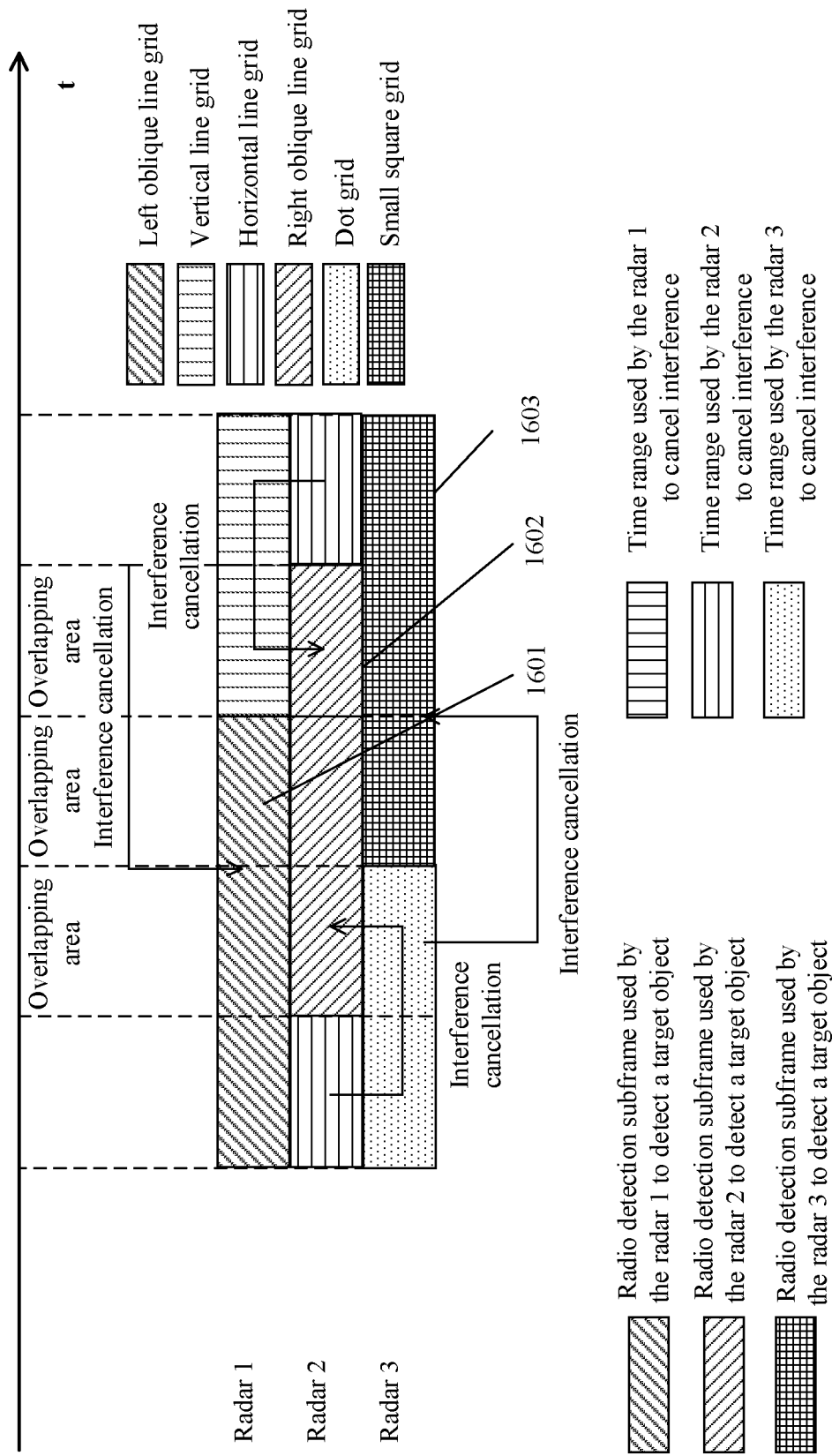
FIG. 17 is a schematic diagram of radar interference cancellation according to an embodiment of the present disclosure.

It is assumed that the first detection apparatus transmits the first radio signal and receives the third radio signal in the first radio detection subframe 1601 of the three radio detection subframes, a second detection apparatus 1 transmits a fourth radio signal and receives a fifth radio signal in the second radio detection subframe 1602 of the three radio detection subframes, and a second detection apparatus 2 transmits a sixth radio signal and receives a seventh radio signal in the third radio detection subframe 1603 in the three radio detection subframes. In this case, the first detection apparatus is a radar 1 in FIG. 17, and a target object is detected by using frequency sweep periods numbered from 0 to 599 in the foregoing 1000 frequency sweep periods. The second detection apparatus 1 is a radar 2 in FIG. 17, and a target object is detected by using frequency sweep periods numbered from 200 to 799 in the foregoing 1000 frequency sweep periods. The second detection apparatus 2 is a radar 3 in FIG. 17, and a target object is detected by using frequency sweep periods numbered from 400 to 999 in the foregoing 1000 frequency sweep periods. In this case, in the first radio detection subframe 1601, an overlapping area includes signals received by the first detection apparatus through propagation of the radio signal transmitted by the second detection apparatus 1 and the radio signal transmitted by the second detection apparatus 2. The signals received by the first detection apparatus through propagation of the radio signal transmitted by the second detection apparatus 1 and the radio signal transmitted by the second detection apparatus 2 may be determined based on the foregoing second radio signal, and the second radio signal is received in time domain represented by a vertical line grid in FIG. 17. As shown in FIG. 17, the time domain represented by the vertical line grid area may be divided into two parts, where the rear part may measure interference generated by the second detection apparatus 2, and the front part may measure a sum of interference generated by the second detection apparatus 1 and interference generated by the second detection apparatus 2. Measurement results of the interference of the two parts are used to separate the signals received by the first detection apparatus through propagation of the radio signals respectively transmitted by the second detection apparatus 1 and the second detection apparatus 2. After determining the signals received by the first detection apparatus through propagation of the radio signal transmitted by the second detection apparatus 1 and the radio signal transmitted by the second detection apparatus 2, the first detection apparatus may cancel, by using the interference signal, an interference part in the radio signal (namely, the third radio signal) received by the first detection apparatus in the first radio detection subframe. The following uses an example for description.

It is assumed that an interference radio frequency signal (equivalent to the rear part of the second radio signal) that is generated by the second detection apparatus 2 and that is measured in an $n^{th}$ frequency sweep period in the rear part of the vertical line grid area is $S_{RF,n,1}^{Rx,i2}(u)$, n=800, 801 . . . , 999. A sum (equivalent to the front part of the second radio signal) of the interference signals that are of the second detection apparatus 1 and the second detection apparatus 2 and that are measured in the $n^{th}$ frequency sweep period in the front part of the vertical grid area is $S_{RF,n,1}^{Rx,i2+i2}(u)$, n=600, 601, . . . , 799. In the $n^{th}$ frequency sweep period in time domain represented by the overlapping area, the radio signal (equivalent to an overlapping part of the third radio signal) received by the first detection apparatus is $S_{RF,n,1}^{Rx,overlap}(u)$, $\tau_i \leq u < T_c$, n=200, 201, . . . , 599. Similarly, according to the formula (1.15), an interference signal $S_{RF,n,1}^{Rx,i1}(u)$, n=600, 601, . . . , 799 that is generated by the second detection apparatus 1 and that is measured in the $n^{th}$ frequency sweep period in the front part of the vertical grid area may be obtained, as shown in the formula (1.17).

$$S_{RF,n,1}^{Rx,i1}(u) = S_{RF,n,1}^{Rx,i1+i2}(u) - S_{RF,q,1}^{Rx,i2}(u)\exp[-j(q-n)\Delta\Phi_{i_2}], \tau_i \leq u < T_c, n=600, 601, \ldots, 799, q=800, 801, \ldots, 999 \quad (1.17)$$

$\Delta\Phi_2$ is a phase difference of radio signals that are in two adjacent periods of interference radio frequency signals generated by the second detection apparatus 2 and that are received by the first detection apparatus 2, and may be obtained by performing signal processing on the interference intermediate frequency signal in the rear part of the vertical line grid area (the same as Embodiment 1). It can be learned from the foregoing formula that the interference radio frequency signal $S_{RF,n,1}^{Rx,i2}(u)$, n=600, 601 . . . , 799 that is generated by the second detection apparatus 2 and that is received by the first detection apparatus 2 in the $n^{th}$ frequency sweep period in the front area of the vertical line grid area may be obtained by using a formula (1.18):

$$S_{RF,n,1}^{Rx,i2}(u) = S_{RF,q,1}^{Rx,i2}(u)\exp[-j(q-n)\Delta\Phi_{i_2}], \tau_i \leq u < T_c, n=600, 601, \ldots, 799, q=800, 801, \ldots, 999 \quad (1.18)$$

In actual application, q in the formula (1.18) is set to a value. In other words, the first detection apparatus may substitute an interference radar radio frequency signal received in a specific period in time domain represented by the rear part of the vertical line grid into the formula (1.18), to obtain $S_{RF,n,1}^{Rx,i2}(u)$, n=600, 601 . . . , 799.

Further, signal processing is performed on the separated interference signal $S_{RF,n,1}^{Rx,i1}(u)$, n=600, 601, . . . , 799 generated by the second detection apparatus 1 in the $n^{th}$ frequency sweep period (which is the same as Embodiment 1), to obtain a phase difference $\Delta\Phi P_{i_1}$ between radio signals that are in two adjacent periods of the interference radio frequency signal generated by the second detection apparatus 1 and that are received by the first detection apparatus. In this case, in time domain represented by the overlapping area, a wanted radio signal $S_{RF,n,1}^{Rx,clean}(u)$, after interference cancellation, that is in the $n^{th}$ frequency sweep period and that is received by the first detection apparatus is shown in a formula (1.19):

$$S_{RF,n,1}^{Rx,clean}(u) = \begin{cases} S_{RF,n,1}^{Rx,overlap}(u) - S_{RF,q,1}^{Rx,i2}(u)\exp[-j(q-n)\Delta\Phi_{i_2}], \\ \qquad n = 200, 201, \ldots, 399 \\ S_{RF,n,1}^{Rx,overlap}(u) - \sum_{m=1}^{2} S_{RF,q,1}^{Rx,im}(u)\exp[-j(q-n)\Delta\Phi_{i_m}], \\ \qquad n = 400, 401, \ldots, 599 \end{cases} \quad (1.19)$$

$$\tau_i \leq u < T_c, n = 200, 201, \ldots, 599, q = 600, 601, \ldots, 799$$

$\Delta\Phi_{i_m}$=1, 2 is a phase difference of radio signals that are in two adjacent periods of interference radio frequency signals generated by the first detection apparatus 1 or by the second detection apparatus 2 and that are received by the first detection apparatus 2.

In actual application, q in the formula (1.19) is set to a value. In other words, the first detection apparatus may substitute an interference radar radio frequency signal received in a specific period in time domain represented by the vertical line grid into the formula (1.19), and traverse radio-frequency signals received in all periods in the overlapping area to cancel interference.

It is assumed that the first detection apparatus transmits the first radio signal and receives the third radio signal in the second radio detection subframe 1602 of the three radio detection subframes, a second detection apparatus 1 transmits a fourth radio signal and receives a fifth radio signal in the first radio detection subframe 1601 of the three radio detection subframes, and a second detection apparatus 2 transmits a sixth radio signal and receives a seventh radio signal in the third radio detection subframe 1603 of the three radio detection subframes. In this case, the first detection apparatus is a radar 2 in FIG. 17, a target object is detected by using frequency sweep periods numbered 200 to 799 in the foregoing 1000 frequency sweep periods. The second detection apparatus 1 is a radar 1 in FIG. 17, and a target object is detected by using frequency sweep periods numbered from 0 to 599 in the foregoing 1000 frequency sweep periods. The second detection apparatus 2 is a radar 3 in FIG. 17, and a target object is detected by using frequency sweep period numbered from 400 to 999 in the foregoing 1000 frequency sweep periods. In the second radio detection subframe 1602, an overlapping area includes signals received by the first detection apparatus through propagation of the radio signal transmitted by the second detection apparatus 1 and the radio signal transmitted by the second detection apparatus 2. The signals received by the first detection apparatus through propagation of the radio signal transmitted by the second detection apparatus 1 and the radio signal transmitted by the second detection apparatus 2 may be determined based on the foregoing second radio signal, and the second radio signal is received in time domain represented by a horizontal line grid in FIG. 17. As shown in FIG. 17, the time domain represented by the horizontal line grid area may be divided into two parts, where the front part may measure an interference signal generated by the second detection apparatus 1, and the rear part may measure an interference signal generated by the second detection apparatus 2. The interference signals of the two parts do not overlap, and therefore the method in Embodiment 1 may be used to perform interference cancellation on the third radio signal. After determining the signals received by the first detection apparatus through propagation of the radio signal transmitted by the second detection apparatus 1 and the radio signal transmitted by the second detection apparatus 2, the first detection apparatus may cancel, by using the interference signal, an interference part in the radio signal (namely, the third radio signal) received by the first detection apparatus in the first radio detection subframe.

It is assumed that the first detection apparatus transmits the first radio signal and receives the third radio signal in the third radio detection subframe 1603 of the three radio detection subframes, a second detection apparatus 1 transmits a fourth radio signal and receives a fifth radio signal in the first radio detection subframe 1601 of the three radio detection subframes, and a second detection apparatus 2 transmits a sixth radio signal and receives a seventh radio signal in the third radio detection subframe 1602 of the three radio detection subframes. In this case, the first detection apparatus is a radar 3 in FIG. 17, a target object is detected by using frequency sweep periods numbered 400 to 999 in the foregoing 1000 frequency sweep periods. The second detection apparatus 1 is a radar 1 in FIG. 17, and a target object is detected by using frequency sweep periods numbered from 0 to 599 in the foregoing 1000 frequency sweep periods. The second detection apparatus 2 is a radar 2 in FIG. 17, and a target object is detected by using frequency sweep period numbered from 200 to 799 in the foregoing 1000 frequency sweep periods. In the third radio detection subframe 1603, an overlapping area includes signals received by the first detection apparatus through propagation of the radio signal transmitted by the second detection apparatus 1 and the radio signal transmitted by the second detection apparatus 2. The signals received by the first detection apparatus through propagation of the radio signal transmitted by the second detection apparatus 1 and the radio signal transmitted by the second detection apparatus 2 may be determined based on the foregoing second radio signal, and the second radio signal is further received in time domain represented by a dot grid in FIG. 17. As shown in FIG. 17, the time domain represented by a dot grid area may be divided into two parts, where the front part may measure interference generated by the second detection apparatus 1, and the rear part may measure a sum of interference signals of the second detection apparatus 1 and the second detection apparatus 2. Measurement results of the interference of the two parts are used to separate the signals received by the first detection apparatus through propagation of the interference signals respectively generated by the second detection apparatus 1 and the second detection apparatus 2. After determining the signals received by the first detection apparatus through propagation of the radio signal transmitted by the second detection apparatus 1 and the radio signal transmitted by the second detection apparatus 2, the first detection apparatus may cancel, by using the interference signal, an interference part in the radio signal (namely, the third radio signal) received by the first detection apparatus in the first radio detection subframe.

It is assumed that an interference radio frequency signal (equivalent to the front part of the second radio signal) that is generated by the second detection apparatus 2 and that is measured in an $n^{th}$ frequency sweep period of the front part of the grid area is $S_{RF,n,1}^{Rx,i2}(u)$, n=0, 1 . . . , 199. A sum (equivalent to the rear part of the second radio signal) of the interference signals that are of the second detection apparatus 1 and the second detection apparatus 2 and that are measured in the $n^{th}$ frequency sweep period of the rear part of the dot grid area is $S_{RF,n,1}^{Rx,i1+i2}(u)$, n=200, 201, . . . , 399. In the $n^{th}$ frequency sweep period in time domain represented by the overlapping area, the radio signal (equivalent to an overlapping part of the third radio signal) received by the first detection apparatus is $S_{RF,n,1}^{Rx,overlap}(u)$, $\tau_i \leq u < T_c$, n=400, 401, . . . , 799. Similarly, according to the formula (1.16), an interference signal $S_{RF,n,1}^{Rx,i1}(u)$, n=200, 201, . . . , 399 that is generated by the second detection apparatus 1 and that is measured in the $n^{th}$ frequency sweep period in the rear part of the dot grid area may be obtained, as shown in the formula (1.20).

$$S_{RF,n,1}^{Rx,i2}(u)=S_{RF,n,1}^{Rx,i1+i2}(u)-S_{RF,q,1}^{RX,i2}(u)\exp[-j(n-q)\Delta\Phi_{i_2}], \tau_i \leq u < T_c, n=200, 201, \ldots, 399, q=0, 1, \ldots, 199, \quad (1.20)$$

$\Delta\Phi_{i_2}$ is a phase difference of radio signals that are in two adjacent periods of interference radio frequency signals generated by the second detection apparatus 2 and that are received by the first detection apparatus 2, and may be obtained by performing signal processing on the interference intermediate frequency signal in the front part of the vertical line grid area (the same as Embodiment 1). It can be learned from the foregoing formula that the interference radio frequency signal $S_{RF,n,1}^{Rx,i2}(u)$, n=200, 201 . . . , 399 that is generated by the second detection apparatus 2 and that is received by the first detection apparatus 2 in the $n^{th}$ frequency sweep period in the rear area of the dot grid area may be obtained by using the following formula:

$$S_{RF,n,1}^{Rx,i2}(u)=S_{RF,q,1}^{Rx,i2}(u)\exp[-j(n-q)\Delta\Phi_{i_2}], \tau_i \leq u < T_c, n=200, 201, \ldots, 399, q=0, 1, \ldots, 199 \quad (1.21)$$

In actual application, q in the formula (1.21) is set to a value. In other words, the first detection apparatus may substitute an interference radar radio frequency signal received in a specific period in time domain represented by the front part of the dot grid into the formula (1.21), to obtain $S_{RF,n,1}^{Rx,i2}(u)$, n=200, 201 . . . , 399.

Further, signal processing is performed on the separated interference signal $S_{RF,n,1}^{Rx,i1}(u)$, n=200, 201, . . . , 399 generated by the second detection apparatus 1 in the $n^{th}$ frequency sweep period (which is the same as Embodiment 1), to obtain a phase difference $\Delta\Phi_{i_1}$ between radio signals that are in two adjacent periods of the interference radio frequency signal generated by the second detection apparatus 1 and that are received by the first detection apparatus. In this case, in time domain represented by the overlapping area, a wanted radio signal $S_{RF,n,1}^{Rx,clean}(u)$, after interference cancellation, that is in the $n^{th}$ frequency sweep period and that is received by the first detection apparatus is shown in a formula (1.22):

$$S_{RF,n,1}^{Rx,clean}(u) = \begin{cases} S_{RF,n,1}^{Rx,overlap}(u) - S_{RF,q,1}^{Rx,i_2}(u)\exp[-j(q-n)\Delta\Phi_{i_2}], \\ \quad n = 600, 601, \ldots, 799 \\ S_{RF,n,1}^{Rx,overlap}(u) - \sum_{m=1}^{2} S_{RF,q,1}^{Rx,i_m}(u)\exp[-j(q-n)\Delta\Phi_{i_m}], \\ \quad n = 400, 401, \ldots, 599 \end{cases}$$

$$\tau_i \le u < T_c, q = 200, 201, \ldots, 399$$

(1.22)

$\Delta\Phi_{i_m}$, m=1, 2 is a phase difference of radio signals that are in two adjacent periods of interference radio frequency signals generated by the first detection apparatus 1 or by the second detection apparatus 2 and that are received by the first detection apparatus 2.

In actual application, q in the formula (1.22) is set to a value. In other words, the first detection apparatus may substitute an interference radar radio frequency signal received in a specific period in time domain represented by the dot grid into the formula (1.22), and traverse radio-frequency signals received in all periods in the overlapping area to cancel interference.

After obtaining the radio signal after interference cancellation, the first detection apparatus determines the intermediate frequency signal based on the radio signal and the transmitted radio signal, and determines information (for example, information such as a distance from the target object, an angle from the target object, and a radial relative velocity from the target object) about the target object based on the intermediate frequency signal.

In the method described in FIG. 12, each detection apparatus transmits a radio signal in a determined time domain range in which mutual interference can be avoided, so as to avoid interference caused by a transmit signal or a related signal of any detection apparatus in determining a target object by another detection apparatus. Partially overlapping between time domains can avoid a waste of time domain resources caused by completely separating frequency sweep periods of a plurality of detection apparatuses in time domain, so that time domain resources can be effectively used, relatively high anti-interference performance can be implemented at a relatively low time domain resource cost, and communication of a larger quantity of radars can be supported.

Optional Embodiment 3: (In a scenario involved in this embodiment, lengths of radio detection subframes included in each radio detection frame are not completely the same.)

Figure 18:
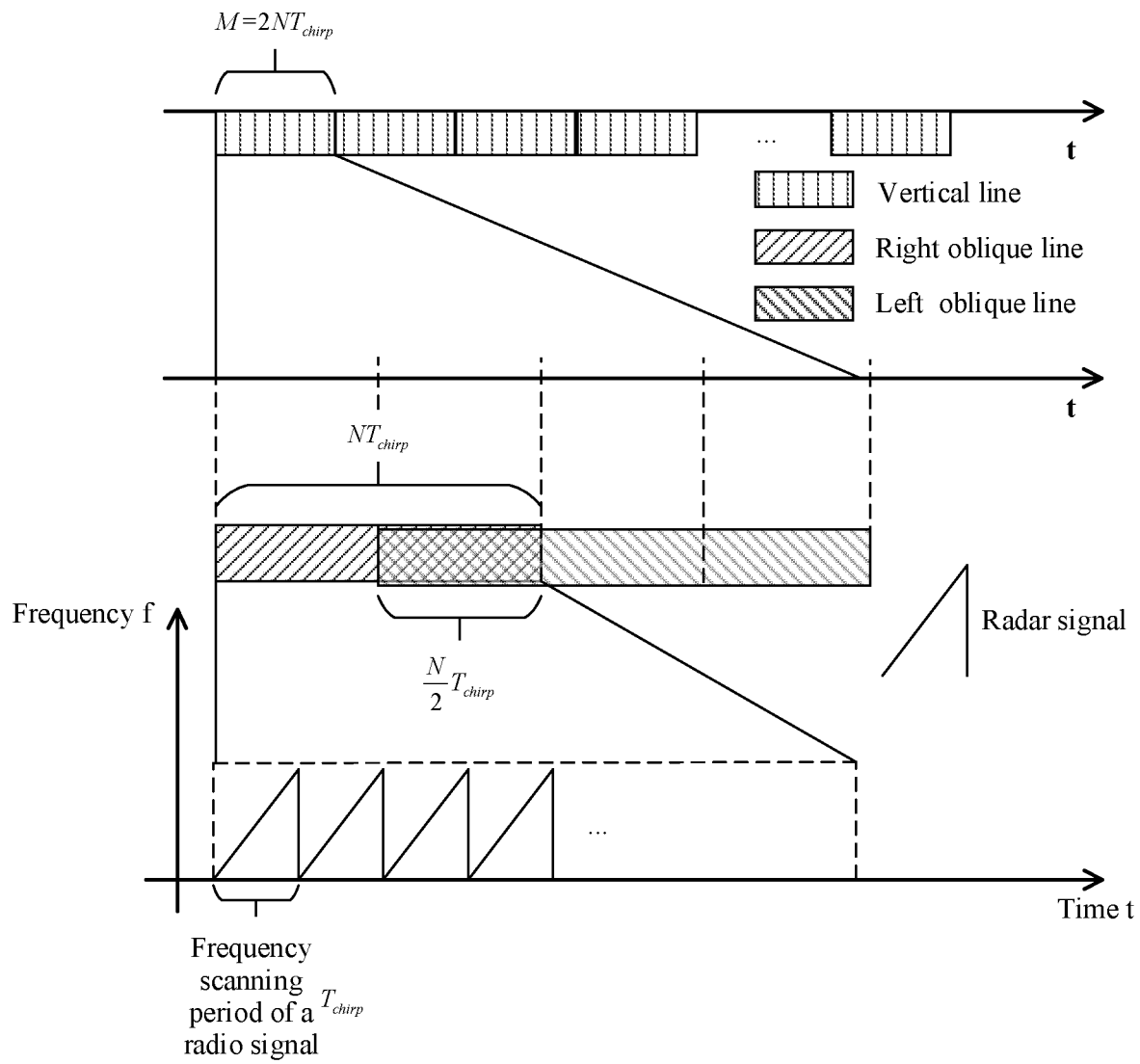
FIG. 18 is a schematic structural diagram of a time domain range according to an embodiment of the present disclosure.

Referring to FIG. 18, it is assumed that each radio detection frame includes two radio detection subframes, where one radio detection subframe is represented by using a left oblique line grid, and the other radio detection subframe is represented by using a right oblique line grid, where a length M of each radio detection frame is equal to 1000 frequency sweep periods (a vertical line area in FIG. 18). For ease of description, the 1000 frequency sweep periods may be numbered, and numbers from the first to the 1000th are sequentially 0, 1, 2, 3, . . . , 998, and 999. A length of the first radio detection subframe is equal to 500 frequency sweep periods, that is $NT_{chirp}$, and a length of the second radio detection subframe is equal to 750 frequency sweep periods, that is $1.5N*T_{chirp}$. Time domain start positions of the two radio detection subframes are spaced by 250 frequency sweep periods, that is $0.5N*T_{chirp}$. Correspondingly, a time domain length of overlapping between one radio detection subframe and the other radio detection subframe is $0.5N*T_{chirp}$ (for example, an area in which the left oblique line grid intersects the right oblique line grid in FIG. 18). It can be learned that the time domain length M of each radio detection frame is equal to $2N*T_{chirp}$. If a transmit cycle of a radio signal is 10 μs, duration of a first radio detection subframe is 5 ms, duration of a second radio detection subframe is 7.5 ms, duration of a radio detection frame is 10 ms, and duration in which the two radio detection subframes overlap in time domain is 2.5 ms. If a first detection apparatus outputs a measurement result every 50 ms, 50 ms may be used as a measurement result output period of the first detection apparatus. In this case, there are five radio detection frames of 10 ms in 50 ms, namely, five radio detection subframes of 5 ms and five radio detection subframes of 7.5 ms. The first detection apparatus may select one radio detection subframe (namely, a first time domain range) from the five radio detection subframes of 5 ms as a working period of the first detection apparatus. In other words, the first detection apparatus is configured to transmit a first radio signal and receive a third radio signal. Alternatively, the first detection apparatus may select one radio detection subframe (namely, a first time domain range) from the five radio detection subframes of 7.5 ms as a working period of the first detection apparatus. In other words, the radio detection subframe is used to transmit a first radio signal and receive a third radio signal.

Figure 19:
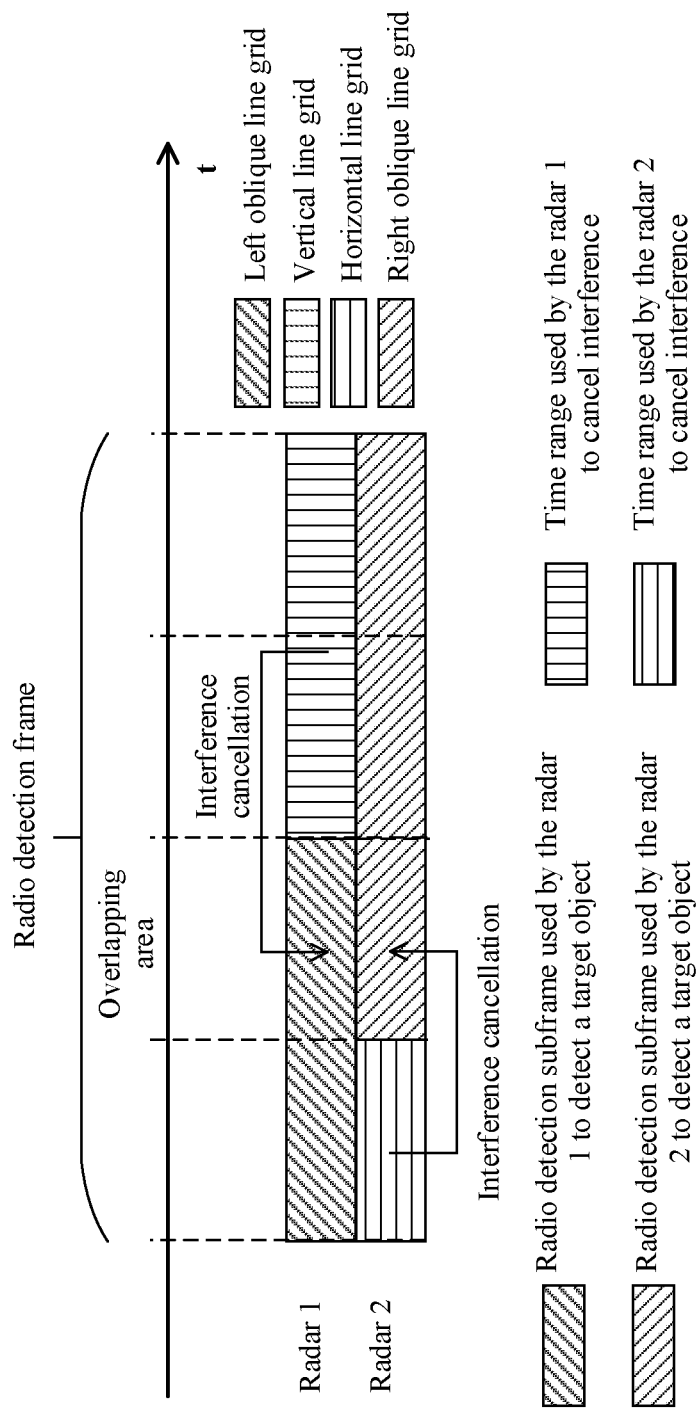
FIG. 19 is a schematic diagram of radar interference cancellation according to an embodiment of the present disclosure.

If the first detection apparatus transmits the first radio signal and receives the third radio signal in the former radio detection subframe of the two radio detection subframes, and a second detection apparatus transmits a fourth radio signal and receive a fifth radio signal in the latter radio detection subframe of the two radio detection subframes. In this case, the first detection apparatus is a radar 1 in FIG. 19, and a target object is detected by using frequency sweep periods numbered 0 to 499 in the 1000 frequency sweep periods. The second detection apparatus is a radar 2 in FIG. 19, and a target object is detected by using frequency sweep periods 250 to 999 in the 1000 frequency sweep periods. In this case, in the former radio detection subframe, an overlapping area includes a signal received by the first detection apparatus through propagation of the radio signal transmitted by the second detection apparatus. As shown in FIG. 19, a specific quantity of the signals received by the first detection apparatus through propagation of the radio signal transmitted by the second detection apparatus may be determined by using a radio signal (namely, the second radio signal) transmitted by the second detection apparatus in time domain represented by a vertical line grid. After determining the signal received by the first detection apparatus through propagation of the radio signal transmitted by the second detection apparatus, the first detection apparatus may cancel, by using the radio signal, an interference part in the radio signal (namely, the third radio signal) received by the first detection apparatus in the former radio detection subframe.

It is assumed that in the $n^{th}$ frequency sweep period in time domain represented by the vertical line grid, an interference radio frequency signal (equivalent to the foregoing second radio signal) received by the first detection apparatus from the second detection apparatus is $S_{RF,n,1}^{Rx,i}(u)$, $\tau_i \le u < T_c$, n=500, 501, . . . , 999, and in an $n^{th}$ frequency sweep period in time domain represented by an overlapping area, a radio signal (a part of the third radio signal) received by the first detection apparatus is $S_{RF,n,1}^{Rx,overlap}(u)$, $\tau_i \le y < T_c$, n=250, 251, . . . , 499, in time domain represented by the overlapping area, a wanted radio signal $S_{RF,n,1}^{Rx,clean}$ (u), after interference cancellation, that is in the $n^{th}$ frequency sweep period and that is received by the first detection apparatus is shown in a formula (1.23):

$$S_{RF,n,1}^{Rx,clean}(u) = S_{RF,n,1}^{Rx,overlap}(u) - S_{RF,q,1}^{Rx,i}(u)\exp[-j(q-n)\Delta\Phi_i], \tau_i \leq u < T_c, n=250, 251, \ldots, 499, q=500, 501, \ldots, 999 \quad (1.23)$$

In actual application, q in the formula (1.23) is set to a value. In other words, the first detection apparatus may substitute an interference radar radio frequency signal received in a specific period in time domain represented by the vertical line grid into the formula (1.23), and traverse radio-frequency signals received in all periods in the overlapping area to cancel interference.

If the first detection apparatus transmits the first radio signal and receives the third radio signal in the latter radio detection subframe of the two radio detection subframes, and the second detection apparatus transmits a fourth radio signal and receive a fifth radio signal in the former radio detection subframe of the two radio detection subframes. In this case, the first detection apparatus is a radar 2 in FIG. 19, and a target object is detected by using frequency sweep periods numbered 250 to 999 in the 1000 frequency sweep periods. The second detection apparatus is a radar 1 in FIG. 19, and a target object is detected by using frequency sweep periods 0 to 499 in the 1000 frequency sweep periods. In this case, in the latter radio detection subframe, an overlapping area includes a signal received by the first detection apparatus through propagation of the radio signal transmitted by the second detection apparatus. As shown in FIG. 19, a specific quantity of the signals received by the first detection apparatus through propagation of the radio signal transmitted by the second detection apparatus may be determined by using a radio signal (namely, the second radio signal) transmitted by the second detection apparatus in time domain represented by a horizontal line grid. After determining the signal received by the first detection apparatus through propagation of the radio signal transmitted by the second detection apparatus, the first detection apparatus may cancel, by using the radio signal, an interference part in the radio signal (namely, the third radio signal) received by the first detection apparatus in the former radio detection subframe.

For example, it is assumed that in an $n^{th}$ frequency sweep period in time domain represented by the horizontal line grid, an interference radio frequency signal (equivalent to the foregoing second radio signal) received by the first detection apparatus from the second detection apparatus is $S_{RF,n,1}^{Rx,i}$ (u), $\tau_i \leq u < T_c$, n=0, 1, ..., 249, and in an $n^{th}$ frequency sweep period in time domain represented by an overlapping area, a radio signal (equivalent to the overlapping part of the third radio signal) received by the first detection apparatus is $S_{RF,n,1}^{Rx,overlap}$ (u), $\tau_i \leq u < T_c$, n=250, 251, ..., 499, in time domain represented by the overlapping area, a wanted radio signal $S_{RF,n,1}^{Rx,clean}$ (u), after interference cancellation, that is received by the first detection apparatus is shown in a formula (1.24):

$$S_{RF,n,1}^{Rx,clean}(u) = S_{RF,n,1}^{Rx,overlap}(u) - S_{RF,q,1}^{Rx,i}(u)\exp[-j(n-q)\Delta\Phi_i], \tau_i \leq u < T_c, n=250, 251, \ldots, 499, q=0, 1, \ldots, 249 \quad (1.24)$$

In actual application, q in the formula (1.24) is set to a value. In other words, the first detection apparatus may substitute an interference radar radio frequency signal received in a specific period in time domain represented by the vertical line grid into the formula (1.24), and traverse radio-frequency signals received in all periods in the overlapping area to cancel interference.

After obtaining the radio signal after interference cancellation (namely, a signal after interference cancellation of the third radio signal), the first detection apparatus determines the intermediate frequency signal based on the radio signal and the transmitted radio signal, and determines information (for example, information such as a distance from the target object, an angle from the target object, and a radial relative velocity from the target object) about the target object based on the intermediate frequency signal.

The foregoing mainly describes the solutions provided in the embodiments of this application from a perspective of interaction between the first detection apparatus (for example, the radar) and the detection apparatus or between the first detection apparatus and the target object. The formula in the foregoing solution is merely a specific expression manner, and all possible variations or modifications made to the formula to resolve a same technical problem and achieve a same or similar technical effect shall fall within the protection scope of this application. It may be understood that, to implement the foregoing functions, each apparatus, for example, the first detection apparatus, includes corresponding hardware structures and/or software modules for performing the functions. A person skilled in the art should be easily aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the first detection apparatus may be obtained according to the foregoing method embodiment. For example, the functional modules may be obtained through division corresponding to functions, or two or more functions may be integrated into one processing module. The integrated module may be implemented in a form of hardware, or may be implemented in a form of a software functional module. It should be noted that division into the modules in the embodiments of this application is an example, is merely logical function division and may be other division in actual implementation.

Figure 20:
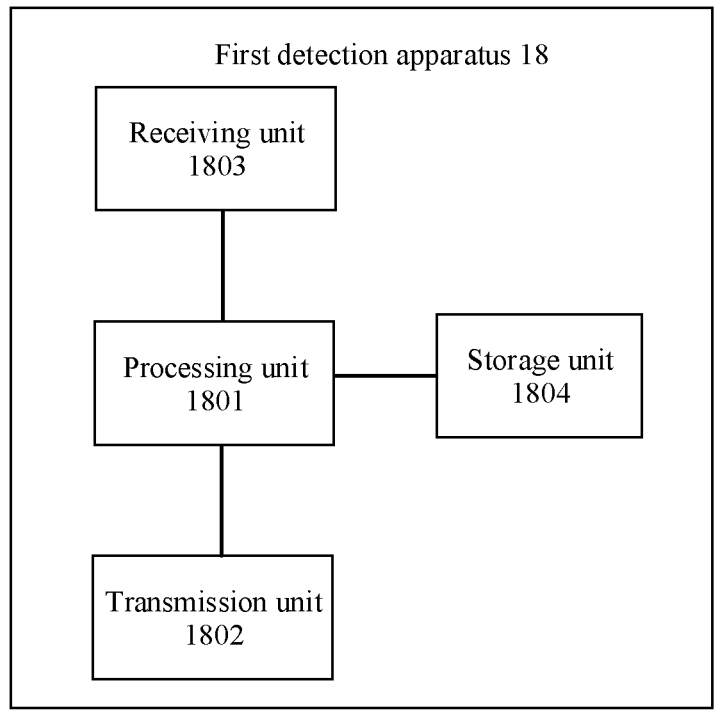
FIG. 20 is a schematic structural diagram of a first detection apparatus according to an embodiment of the present disclosure.

For example, when the functional modules of the detection apparatus are divided in an integrated manner, FIG. 20 is a possible schematic structural diagram of the first detection apparatus according to the foregoing embodiments of this application. The first detection apparatus 18 may include a processing unit 1801, configured to determine to a first time domain range, where the first time domain range is one of L time domain ranges, and a transmission unit 1802, configured to transmit a first radio signal in the first time domain range, where any one of the L time domain ranges partially overlaps at least one of the other L−1 time domain ranges, and an absolute value of a difference between time domain start positions of any two of the L time domain ranges is not less than a first threshold F, and is less than a time domain length of a time domain range with a shortest time domain length in the L time domain ranges. In other words, any two of the L time domain ranges partially overlap (not completely overlap) in time domain, and an absolute value of a difference between time domain start positions of any two of the L time domain ranges is not less than the first threshold F. L is a positive integer greater than 1.

Optionally, the first threshold F is greater than or equal to a frequency sweep period of the first radio signal, and the first threshold F is an integer multiple of the frequency sweep period of the first radio signal, or an absolute value of a difference between a time domain start position of any one of the L time domain ranges except the first time domain range and a time domain start position of the first time domain range is a positive integer multiple of the first threshold F, where the first threshold F is greater than or equal to the frequency sweep period of the first radio signal, and the first threshold F is an integer multiple of the frequency sweep period of the first radio signal.

Optionally, time domain lengths of the L time domain ranges are the same, and the time domain length is an integer multiple of the frequency sweep period of the first radio signal.

Optionally, there are at least two time domain ranges with different time domain lengths in the L time domain ranges. Further, a time domain length of each time domain range is a positive integer multiple of the frequency sweep period of the first radio signal.

Optionally, the transmit unit is further configured to receive a second radio signal at a time domain position other than the first time domain range in the L time domain ranges, where the second radio signal comes from at least one second detection apparatus. Further, the second radio signal may be one or more second radio signals. In a case in which there are a plurality of second detection apparatuses, the second radio signal is a plurality of second radio signals that are respectively corresponding to the plurality of second detection apparatuses.

Optionally, a time domain position other than the first time domain range in the L time domain ranges includes a time domain position in at least one second time domain range, the at least one second time domain range belongs to the L time domain ranges, and the at least one second time domain range is corresponding to the at least one second detection apparatus.

Optionally, the first detection apparatus 18 further includes a receiving unit 1803, configured to receive a third radio signal in the first time domain range, where the third radio signal includes a reflected signal of the first radio signal.

Optionally, after the receiving unit 1803 receives the third radio signal in the first time domain range, the processor 1801 is further configured to determine information about the target object based on the third radio signal and the second radio signal.

Optionally, the first detection apparatus may further include a memory 1804, configured to store a program instruction and/or data for the processor 1801 to read.

The optional design may be independently implemented, or may be integrated with any one of the foregoing optional designs for implementation.

Figure 21:
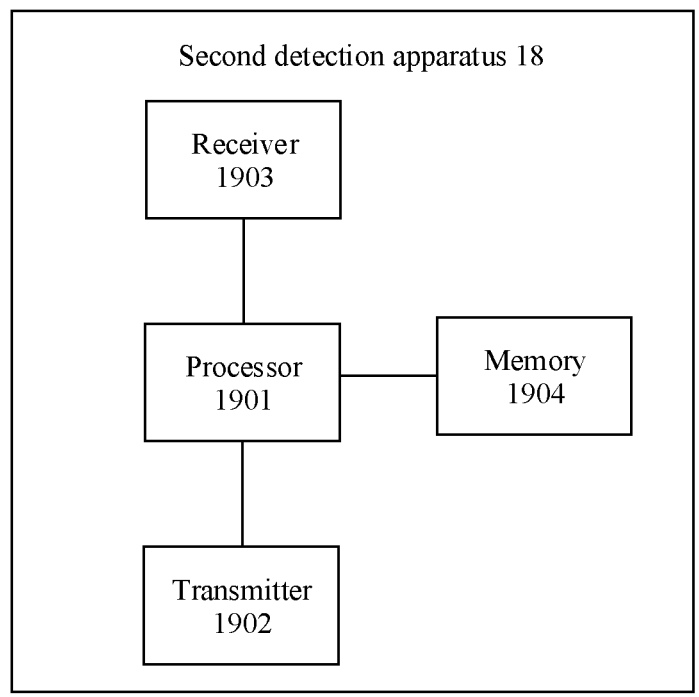
FIG. 21 is a schematic structural diagram of a first detection apparatus according to an embodiment of the present disclosure.

FIG. 21 is another possible schematic structural diagram of a first detection apparatus according to an embodiment of this application. The first detection apparatus 18 may include a processor 1901, a transmitter 1902, and a receiver 1903. Functions of the processor 1901, the transmitter 1902, and the receiver 1903 may be respectively corresponding to specific functions of the processing unit 1801, the transmission unit 1802, and the receiving unit 1803 shown in FIG. 20. Details are not described herein again. Optionally, the detection apparatus may further include a memory 1904, configured to store a program instruction and/or data for the processor 1801 to read.

Figure 22:
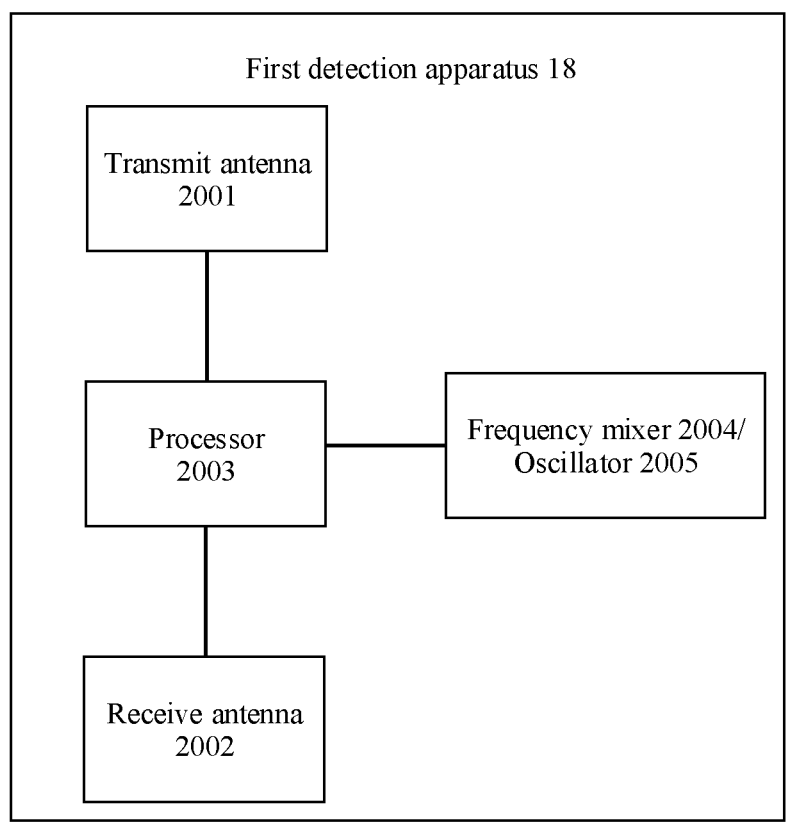
FIG. 22 is a schematic structural diagram of a first detection apparatus according to an embodiment of the present disclosure.

FIG. 2 is a schematic structural diagram of a radar apparatus. With reference to the foregoing content, another optional manner is proposed. FIG. 22 shows yet another possible schematic structural diagram of a first detection apparatus. The first detection apparatus provided in FIG. 20 to FIG. 22 may be a part or all of a radar apparatus in an actual communication scenario, and may be integrated in the radar apparatus or located outside the radar apparatus, so as to implement a corresponding function. A structure and composition are not limited.

In this optional manner, the first detection apparatus 18 includes a transmit antenna 2001, a receive antenna 2002, and a processor 2003. Further, the first detection apparatus further includes a frequency mixer 2004 and/or an oscillator 2005. Further, the first detection apparatus may further include a low-pass filter, a directional coupler, and/or the like. The transmit antenna and the receive antenna are configured to support the detection apparatus in performing radio communication, the transmit antenna supports transmission of a radio signal, and the receive antenna supports reception of a radio signal and/or reception of a reflected signal, so as to finally implement a detection function. The processor performs some possible and/or determined processing functions. Further, an operation of the transmit antenna and/or the receive antenna is also controlled. Further, the processor controls the transmit antenna to transmit a signal that needs to be transmitted, and a signal received by using the receive antenna may be transmitted to the processor for corresponding processing. Components included in the detection apparatus may be configured to perform any implementation solution related to the method embodiments of this application. Optionally, the detection apparatus may further include a memory, configured to store a program instruction and/or data. The transmit antenna and the receive antenna may be disposed independently, or may be integrated as a transmit/receive antenna to perform a corresponding transmit/receive function.

It should be noted that the second detection apparatus or any detection apparatus in the embodiments of this application may have a structure the same as that of the first detection apparatus, that is, is also applicable to the schematic structural diagrams in FIG. 20 to FIG. 22.

In still another optional manner, when the detection apparatus is implemented by using software, all or some of the detection apparatus may be implemented in a form of a computer program product. The computer program product includes one or more computer instructions. When the computer program instructions are loaded and executed on a computer, all or some of the procedures or functions in the embodiments of this application are implemented. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive Solid State Disk (SSD)), or the like.

It should be noted that the processor included in the detection apparatus configured to perform the detection method provided in this embodiment of this application may be a central processing unit (CPU), a general purpose processor, a digital signal processor (DSP), an application-specific integrated circuit (ASIC), a field-programmable gate array (FPGA), another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm steps described in combination with the embodiments of this application may be implemented by hardware, or may be implemented by a processor by executing a software instruction. The software instruction may be formed by a corresponding software module. The software module may be located in a random-access memory (RAM), a flash memory, a read-only memory (ROM), an erasable programmable ROM (EPROM), an electrically EPROM (EEPROM), a register, a hard disk, a removable magnetic disk, a compact disc (CD) ROM (CD-ROM), or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the detection apparatus. Certainly, the processor and the storage medium may exist in the detection apparatus as separate components.

It may be understood that FIG. 20 to FIG. 22 show merely simplified designs of the detection apparatus. In an actual application, the detection apparatus may include any quantity of transmitters, receivers, processors, controllers, memories, and other elements that may exist.

An embodiment of this application further provides a communications system. The communications system includes at least one detection apparatus and/or at least one target object mentioned in the foregoing embodiments of this application.

An embodiment of this application further provides a communications system. The communications system includes at least one detection apparatus and/or at least one central processing unit/central controller mentioned in the foregoing embodiments of this application. The central processing unit/central controller is configured to control processing of the vehicle and/or another detection apparatus based on an output of the at least one detection apparatus. The central processing unit/central controller may be located in a vehicle, or in another possible position, to implement the control.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the other approaches, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   transmitting a first radio signal in a first time domain range of a whole time domain, wherein the first time domain range is one of L time domain ranges,
   wherein each one of the L time domain ranges partially overlaps another one of the L time domain ranges, wherein a first absolute value of a first difference between time domain start positions of any two of the L time domain ranges is not less than a first threshold (F) and is less than a first time domain length of a time domain range with a shortest time domain length in the L time domain ranges, wherein F is greater than or equal to a frequency sweep period of the first radio signal, wherein F is an integer multiple of the frequency sweep period, and wherein L is a positive integer greater than 1.

2. The method of claim 1, wherein a second absolute value of a second difference between a first time domain start position of any one of the L time domain ranges except the first time domain range and a second time domain start position of the first time domain range is a positive integer multiple of F.

3. The method of claim 1, wherein time domain lengths of the L time domain ranges are an integer multiple of a first the frequency sweep period of the first radio signal.

4. The method of claim 1, further comprising receiving a second radio signal from a detection apparatus at a time domain position other than the first time domain range.

5. The method of claim 4, wherein the L time domain ranges further comprise a second time domain range corresponding to the detection apparatus.

6. The method of claim 4, further comprising receiving a third radio signal in the first time domain range, wherein the third radio signal comprises a reflected signal of the first radio signal.

7. The method of claim 6, wherein information of a target object is based on the third radio signal and the second radio signal.

8. The method of claim 7, wherein a phase difference ($\Delta\Phi_i$) between two adjacent frequency sweep periods of the second radio signal is based on the second radio signal and the first radio signal, wherein the method further comprises performing interference cancellation on the third radio signal based on $\Delta\Phi_i$ and the second radio signal to obtain an intermediate frequency signal; and determining, and wherein the information is based on the intermediate frequency signal.

9. A first apparatus comprising:
a processor; and
a memory in communication with the processor and configured to store program instructions, wherein, when executed by the processor, the program instructions cause the first apparatus to:
transmit a first radio signal in a first time domain range of a whole time domain, wherein the first time domain range is one of L time domain ranges,
wherein each one of the L time domain ranges partially overlaps another one of the L time domain ranges, wherein a first absolute value of a first difference between time domain start positions of any two of the L time domain ranges is not less than a first threshold (F) and is less than a first time domain length of a time domain range with a shortest time domain length in the L time domain ranges, wherein F is greater than or equal to a frequency sweep period of the first radio signal, wherein F is an integer multiple of the frequency sweep period, and wherein L is a positive integer greater than 1.

10. The first apparatus of claim 9, wherein a second absolute value of a second difference between a first time domain start position of any one of the L time domain ranges except the first time domain range and a second time domain start position of the first time domain range is a positive integer multiple of F.

11. The first apparatus of claim 9, wherein second time domain lengths of the L time domain ranges are the same, and wherein each of the second time domain lengths is an integer multiple of a first the frequency sweep period of the first radio signal.

12. The first apparatus of claim 9, wherein, when executed by the processor, the program instructions further cause the first apparatus to receive a second radio signal from a second apparatus at a time domain position other than the first time domain range.

13. The first apparatus of claim 12, wherein the L time domain ranges further comprise a second time domain range corresponding to the second apparatus.

14. The first apparatus of claim 12, wherein, when executed by the processor, the program instructions further cause the first apparatus to receive a third radio signal in the first time domain range, and wherein the third radio signal comprises a reflected signal of the first radio signal.

15. The first apparatus of claim 14, wherein information of a target object is based on the third radio signal and the second radio signal.

16. The first apparatus of claim 15, wherein a phase difference ($\Delta\Phi_i$) between two adjacent frequency sweep periods of the second radio signal is based on the second radio signal and the first radio signal; signal, wherein, when executed by the processor, the program instructions further cause the first apparatus to determine perform interference cancellation on the third radio signal based on $\Delta\Phi_i$ and the second radio signal to obtain an intermediate frequency signal; and determine, and wherein the information is based on the intermediate frequency signal.

17. A vehicle comprising:
a first detection apparatus comprising:
a transmit antenna configured to transmit a first radio signal in a first time domain range of a whole time domain, wherein the first time domain range is one of L time domain ranges,
wherein each one of the L time domain ranges partially overlaps another one of the L time domain ranges, wherein a first absolute value of a first difference between time domain start positions of any two of the L time domain ranges is not less than a first threshold (F) and is less than a first time domain length of a time domain range with a shortest time domain length in the L time domain ranges, wherein F is greater than or equal to a frequency sweep period of the first radio signal, wherein F is an integer multiple of the frequency sweep period, and wherein L is a positive integer greater than 1.

18. The vehicle of claim 17, wherein a second absolute value of a second difference between a first time domain start position of any one of the L time domain ranges except the first time domain range and a second time domain start position of the first time domain range is a positive integer multiple of F.

19. The vehicle of claim 17, wherein time domain lengths of the L time domain ranges are an integer multiple of a first the frequency sweep period of the first radio signal.

20. The vehicle of claim 17, wherein the first detection apparatus further comprises a receive antenna configured to receive from a second detection apparatus a second radio signal at a time domain position other than the first time domain range.

* * * * *

UNITED STATES PATENT AND TRADEMARK OFFICE
CERTIFICATE OF CORRECTION

| | | |
|---|---|---|
| PATENT NO. | : 12,204,044 B2 | Page 1 of 1 |
| APPLICATION NO. | : 17/462690 | |
| DATED | : January 21, 2025 | |
| INVENTOR(S) | : Sida Song, Sha Ma and Lutao Gao | |

It is certified that error appears in the above-identified patent and that said Letters Patent is hereby corrected as shown below:

In the Claims

Claim 8, Column 41, Line 32: "signal; and determining, and" should read "signal, and"

Claim 16, Column 42, Line 24: "radio signal; signal, wherein" should read "radio signal, wherein"

Claim 16, Column 42, Line 29: "signal; and determining, and" should read "signal, and"

Signed and Sealed this
Eighteenth Day of March, 2025

Coke Morgan Stewart
*Acting Director of the United States Patent and Trademark Office*